(12) United States Patent
Lin et al.

(10) Patent No.: US 11,785,597 B2
(45) Date of Patent: Oct. 10, 2023

(54) TERMINAL APPARATUS, BASE STATION APPARATUS, AND COMMUNICATION METHOD

(71) Applicant: Sharp Kabushiki Kaisha, Sakai (JP)

(72) Inventors: Huifa Lin, Sakai (JP); Shoichi Suzuki, Sakai (JP); Daiichiro Nakashima, Sakai (JP); Toshizo Nogami, Sakai (JP); Wataru Ouchi, Sakai (JP); Tomoki Yoshimura, Sakai (JP); Taewoo Lee, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 137 days.

(21) Appl. No.: 17/617,609

(22) PCT Filed: Apr. 23, 2020

(86) PCT No.: PCT/JP2020/017568
§ 371 (c)(1),
(2) Date: Dec. 9, 2021

(87) PCT Pub. No.: WO2020/250576
PCT Pub. Date: Dec. 17, 2020

(65) Prior Publication Data
US 2022/0232601 A1    Jul. 21, 2022

(30) Foreign Application Priority Data

Jun. 14, 2019   (JP) ................................ 2019-111115

(51) Int. Cl.
*H04W 72/1273*     (2023.01)
*H04L 1/1812*       (2023.01)
(Continued)

(52) U.S. Cl.
CPC ....... *H04W 72/1273* (2013.01); *H04L 1/1812* (2013.01); *H04L 5/0053* (2013.01); *H04W 72/23* (2023.01)

(58) Field of Classification Search
CPC .... H04L 5/0053; H04L 1/1812; H04W 72/23; H04W 72/1273
(Continued)

(56) References Cited

U.S. PATENT DOCUMENTS

2020/0344012 A1* 10/2020 Karaki ................ H04L 1/1812
2020/0351026 A1* 11/2020 Babaei ................ H04L 1/1822

OTHER PUBLICATIONS

Samsung, "HARQ enhancements for NR-U", 3GPP TSG RAN WG1 #97, R1-1906922, May 13-17, 2019, 7 pages.
(Continued)

*Primary Examiner* — Peter G Solinsky
(74) *Attorney, Agent, or Firm* — KEATING & BENNETT, LLP

(57) ABSTRACT

A terminal apparatus receives a PDCCH and receive a PDSCH scheduled by the PDCCH, and transmits (reports), via a PUCCH or a PUSCH, HARQ-ACK information corresponding to the PDSCH. Based at least on the PDCCH, a PDSCH group ID and a toggle bit corresponding to the PDSCH group ID are indicated. In a case that the toggle bit is toggled, HARQ-ACK information being already reported (the HARQ-ACK information other than HARQ-ACK information not being reported yet) is deleted from an HARQ-ACK codebook corresponding to the PDSCH group ID. The HARQ-ACK information corresponding to the PDSCH scheduled by the PDCCH is included in the HARQ-ACK codebook.

3 Claims, 14 Drawing Sheets

|  | PDCCH1101 | PDCCH1102 | PDCCH1103 | PDCCH1104 | PDCCH1105 |
|---|---|---|---|---|---|
| PGI | G1 | G2 | G1 | G2 | G1 |
| RPG | G1 |  | (G1, G2) |  | (G1, G2) |
| C-DAI | 1 | 1 | 1 | 2 | 1 |
| Received NFI | (0,0) | (0,0) | (1,0) | (1,0) | (0,1) |
| Stored NFI | (0,0) | (0,0) | (0,0) | (1,0) | (1,0) |
| G1 toggled? | No | No | Yes | No | Yes |
| G2 toggled? | No | No | No | No | Yes |
| HARQ-ACK status (PDSCH 1111) | Not-reported | Not-reported | Reported | N/A | N/A |
| HARQ-ACK status (PDSCH 1112) | N/A | Not-reported | Not-reported | Not-reported | Reported |
| HARQ-ACK status (PDSCH 1113) | N/A | N/A | Not-reported | Not-reported | Reported |
| HARQ-ACK status (PDSCH 1114) | N/A | N/A | N/A | Not-reported | Not-reported |
| HARQ-ACK status (PDSCH 1115) | N/A | N/A | N/A | N/A | Not-reported |

(51) Int. Cl.
*H04L 5/00* (2006.01)
*H04W 72/23* (2023.01)

(58) Field of Classification Search
USPC .......................................................... 370/329
See application file for complete search history.

(56) References Cited

OTHER PUBLICATIONS

MediaTek Inc., "Enhancements to HARQ for NR-U operation", 3GPP TSG RAN WG1 #97, R1-1906545, May 13-17, 2019, 11 pages.
NTT Docomo, Inc., "HARQ enhancement for NR-U", 3GPP TSG RAN WG1 #96bis, R1-1904951, Apr. 8-12, 2019, pp. 1-7.
NTT Docomo, "New SID Proposal: Study on New Radio Access Technology", RP-160671, 3GPP TSG RAN Meeting #71, Mar. 7-10, 2016, 8 pages.

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

<A1> Set $c=0$ — serving cell index: lower indexes correspond to lower RRC indexes of corresponding cell <A2> Set $m=0$ — PDCCH with DCI format 1_0 or DCI format 1_1 monitoring occasion index: lower index corresponds to earlier PDCCH with DCI format 1_0 or DCI format 1_1 monitoring occasion 1001.

<A3> Set $j=0$

<A4> Set $V_{temp}=0$

<A5> Set $V_{temp2}=0$

<A6> Set $V_R=\emptyset$

<A7> Set $N_{cells}^{DL}$ to the number of serving cells configured by higher layers for the UE <A8> Set $M$ to the number of PDCCH monitoring occasion(s) 1001

<A9> while $m<M$

<A10> Set $c=0$

<A11> while $c<N_{cells}^{DL}$

<A12> if PDCCH monitoring occasion $m$ is before an active DL BWP change on serving cell $c$ or an active UL BWP change on the PCell and an active DL BWP change is not triggered by a DCI format 1_1 in PDCCH monitoring occasion $m$ <A13> $c=c+1$;

<A14> else

<A15> if there is a PDSCH on serving cell $c$ associated with PDCCH in PDCCH monitoring occasion $m$, or there is a PDCCH indicating SPS PDSCH release on serving cell $c$ <A16> if $V_{C-DAL,c,m}^{DL} \leq V_{temp}$ <A17> $j=j+1$ <A18> end if <A19> $V_{temp}=V_{C-DAL,c,m}^{DL}$ <A20> if $V_{T-DAL,m}^{DL}=\emptyset$

FIG. 8

<A25>   if *harq-ACK-SpatialBundlingPUCCH* is not provided and $m$ is a monitoring occasion for PDCCH with DCI format 1_0 or DCI format 1_1 and the UE is configured by *maxNrofCodeWordsScheduledByDCI* with reception of two transport blocks for at least one configured DL BWP of at least one serving cell, <A26>   $\tilde{o}^{ACK}_{8j+2(V^{DL}_{C-DAI,c,m}-1)}$ = HARQ-ACK information bit corresponding to the first transport block of this cell <A27>   $\tilde{o}^{ACK}_{8j+2(V^{DL}_{C-DAI,c,m}-1)+1}$ = HARQ-ACK information bit corresponding to the second transport block of this cell <A28>   $V_s = V_s \cup \{8j + 2(V^{DL}_{C-DAI,c,m}-1), 8j + 2(V^{DL}_{C-DAI,c,m}-1)+1\}$ <A29>   elseif *harq-ACK-SpatialBundlingPUCCH* is provided to the UE and $m$ is a monitoring occasion for PDCCH with DCI format 1_1 and the UE is configured by *maxNrofCodeWordsScheduledByDCI* with reception of two transport blocks in at least one configured DL BWP of a serving cell, <A30>   $\tilde{o}^{ACK}_{4j+V^{DL}_{C-DAI,c,m}-1}$ = binary AND operation of the HARQ-ACK information bits corresponding to the first and second transport blocks of this cell <A31>   $V_s = V_s \cup \{4j + V^{DL}_{C-DAI,c,m} - 1\}$ <A32>   else <A33>   $\tilde{o}^{ACK}_{4j+V^{DL}_{C-DAI,c,m}-1}$ = HARQ-ACK information bit of this cell <A34>   $V_s = V_s \cup \{4j + V^{DL}_{C-DAI,c,m} - 1\}$ <A35>   end if <A36>   end if <A37>   $c = c + 1$ <A38>   end if <A39>   end while <A40>   $m = m + 1$

FIG. 9

<A42>   if $V_{temp2} < V_{temp}$

<A43>   $j = j+1$

<A44>   end if

<A45>   if *harq-ACK-SpatialBundlingPUCCH* is not provided to the UE and the UE is configured by *maxNrofCodeWordsScheduledByDCI* with reception of two transport blocks for at least one configured DL BWP of a serving cell, <A46>   $O^{ACK} = 2 \cdot (4 \cdot j + V_{temp2})$ <A47>   else <A48>   $O^{ACK} = 4 \cdot j + V_{temp2}$ <A49>   end if <A50>   $\tilde{o}_i^{ACK} = \text{NACK}$ for any $i \in \{0,1,...,O^{ACK}-1\} \setminus V_s$ <A51>   Set $c = 0$ <A52>   while $c < N_{cells}^{DL}$ <A53>   if SPS PDSCH reception is activated for a UE and the UE is configured to receive SPS PDSCH in a slot $n - K_{1,c}$ for serving cell $c$, where $K_{1,c}$ is the PDSCH-to-HARQ-feedback timing value for SPS PDSCH on serving cell $c$ <A54>   $O^{ACK} = O^{ACK} + 1$ <A55>   $o_{O^{ACK}-1}^{ACK}$ = HARQ-ACK information bit associated with the SPS PDSCH reception <A56>   end if <A57>   $c = c+1$;

<A58>   end while

FIG. 10

|  | PDCCH1101 | PDCCH1102 | PDCCH1103 | PDCCH1104 | PDCCH1105 |
|---|---|---|---|---|---|
| Stored value for NFI for G2 | initial value | initial value | first value | first value | second value |
| Received value for NFI for G2 | not indicated | first value | not indicated | second value | third value |

FIG. 12

| | PDCCH1101 | PDCCH1102 | PDCCH1103 | PDCCH1104 | PDCCH1105 |
|---|---|---|---|---|---|
| PG1 | G1 | G2 | G1 | G2 | G1 |
| RPG | G1 | | (G1, G2) | | (G1, G2) |
| C-DAI | 1 | 1 | 1 | 2 | 1 |
| Received NFI | (0,0) | (0,0) | (1,0) | (1,0) | (0,1) |
| Stored NFI | (0,0) | (0,0) | (0,0) | (1,0) | (1,0) |
| G1 toggled? | No | No | Yes | No | Yes |
| G2 toggled? | No | No | No | No | Yes |
| HARQ-ACK status (PDSCH 1111) | Not-reported | Not-reported | Reported | N/A | N/A |
| HARQ-ACK status (PDSCH 1112) | N/A | Not-reported | Not-reported | Not-reported | Reported |
| HARQ-ACK status (PDSCH 1113) | N/A | N/A | Not-reported | Not-reported | Reported |
| HARQ-ACK status (PDSCH 1114) | N/A | N/A | N/A | Not-reported | Not-reported |
| HARQ-ACK status (PDSCH 1115) | N/A | N/A | N/A | N/A | Not-reported |

FIG. 13

|  | PDCCH1101 | PDCCH1102 | PDCCH1103 | PDCCH1104 | PDCCH1105 |
|---|---|---|---|---|---|
| PG1 | G1 | G2 | G1 | G2 | G1 |
| RPG | G1 |  | (G1, G2) |  | (G1, G2) |
| C-DAI | 1 | 1 | 1 | 2 | 2 |
| Received NFI | (0,0) | (0,0) | (1,0) | (1,0) | (1,0) |
| Stored NFI | (0,0) | (0,0) | (0,0) | (1,0) | (1,0) |
| G1 toggled? | No | No | Yes | No | No |
| G2 toggled? | No | No | No | No | No |
| HARQ-ACK status (PDSCH 1111) | Not-reported | Not-reported | Reported | Reported | Reported |
| HARQ-ACK status (PDSCH 1112) | N/A | Not-reported | Not-reported | Not-reported | Reported |
| HARQ-ACK status (PDSCH 1113) | N/A | N/A | Not-reported | Not-reported | Reported |
| HARQ-ACK status (PDSCH 1114) | N/A | N/A | N/A | Not-reported | Not-reported |
| HARQ-ACK status (PDSCH 1115) | N/A | N/A | N/A | N/A | Not-reported |

FIG. 14

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2019-111115 filed on Jun. 14, 2019, the contents of which are incorporated herein by reference.

BACKGROUND ART

In the $3^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as User Equipment (UE). LTE is a cellular communication system in which multiple areas covered by a base station apparatus are distributed in a cell structure. A single base station apparatus may manage multiple serving cells.

3GPP has been studying a next generation standard (New Radio or NR) (NPL 1) to make a proposal for International Mobile Telecommunication (IMT)-2020, a standard for a next generation mobile communication system developed by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10Mar., 2016.

SUMMARY OF INVENTION

Technical Problem

One aspect of the present invention provides a terminal apparatus that efficiently performs communication, a communication method used for the terminal apparatus, a base station apparatus that efficiently performs communication, and a communication method used for the base station apparatus.

Solution to Problem (1) A first aspect of the present invention is a terminal apparatus including: a receiver configured to receive a PDCCH and receive a PDSCH scheduled by the PDCCH; and a transmitter configured to transmit (report), via a PUCCH or a PUSCH, HARQ-ACK information corresponding to the PDSCH, wherein PDCCH #C, PDCCH #G, and PDCCH #I are received, PDSCH #C is scheduled by the PDCCH #C, PDSCH #G is scheduled by the PDCCH #G, and PDSCH #I is scheduled by the PDCCH #I, the PDCCH #G indicates a second value, and the PDCCH #I indicates a third value, the PDCCH #I indicates transmission of at least HARQ-ACK information #I corresponding to the PDSCH #I on PUCCH #3, in a case that the second value and the third value are different from each other, HARQ-ACK information #G corresponding to the PDSCH #G and the HARQ-ACK information #I are multiplexed on the PUCCH #3, in a case that the second value is equal to the third value, HARQ-ACK information #C corresponding to the PDSCH #C, the HARQ-ACK information #G, and the HARQ-ACK information #I are multiplexed on the PUCCH #3, the HARQ-ACK information #G is new transmission on the PUCCH #3, and the HARQ-ACK information #C is retransmission on the PUCCH #3.

(2) A second aspect of the present invention is a terminal apparatus including: a receiver configured to receive a PDCCH and receive a PDSCH scheduled by the PDCCH; and a transmitter configured to transmit (report), via a PUCCH or a PUSCH, HARQ-ACK information corresponding to the PDSCH, wherein based at least on the PDCCH, a PDSCH group ID and a toggle bit corresponding to the PDSCH group ID are indicated, in a case that the toggle bit is toggled, HARQ-ACK information being already reported (the HARQ-ACK information other than HARQ-ACK information not being reported yet) is deleted from an HARQ-ACK codebook corresponding to the PDSCH group ID, and the HARQ-ACK information corresponding to the PDSCH scheduled by the PDCCH is included in the HARQ-ACK codebook.

(3) A third aspect of the present invention is a base station apparatus including: a transmitter configured to transmit a PDCCH and transmit a PDSCH scheduled by the PDCCH; and a receiver configured to receive, via a PUCCH or a PUSCH, HARQ-ACK information corresponding to the PDSCH, wherein PDCCH #C, PDCCH #G, and PDCCH #I are transmitted, PDSCH #C is scheduled by the PDCCH #C, PDSCH #G is scheduled by the PDCCH #G, and PDSCH #I is scheduled by the PDCCH #I, the PDCCH #G indicates a second value, and the PDCCH #I indicates a third value, the PDCCH #I indicates transmission of at least HARQ-ACK information #I corresponding to the PDSCH #I on PUCCH #3, in a case that the second value and the third value are different from each other, HARQ-ACK information #G corresponding to the PDSCH #G and the HARQ-ACK information #I are multiplexed on the PUCCH #3, in a case that the second value is equal to the third value, HARQ-ACK information #C corresponding to the PDSCH #C, the HARQ-ACK information #G, and the HARQ-ACK information #I are multiplexed on the PUCCH #3, the HARQ-ACK information #G is new transmission on the PUCCH #3, and the HARQ-ACK information #C is retransmission on the PUCCH #3.

(4) A fourth aspect of the present invention is a base station apparatus including: a transmitter configured to transmit a PDCCH and transmit a PDSCH scheduled by the PDCCH; and a receiver configured to receive, via a PUCCH or a PUSCH, HARQ-ACK information corresponding to the PDSCH, wherein based at least on the PDCCH, a PDSCH group ID and a toggle bit corresponding to the PDSCH group ID are indicated, in a case that the toggle bit is toggled, HARQ-ACK information being already reported (the HARQ-ACK information other than HARQ-ACK information not being reported yet) is deleted from an HARQ-ACK codebook corresponding to the PDSCH group ID, and the HARQ-ACK information corresponding to the PDSCH scheduled by the PDCCH is included in the HARQ-ACK codebook.

(5) A fifth aspect of the present invention is a communication method used for a terminal apparatus, the communication method including the steps of: receiving a PDCCH and receiving a PDSCH scheduled by the PDCCH; and transmitting (reporting), via a PUCCH or a PUSCH, HARQ-ACK information corresponding to the PDSCH, wherein PDCCH #C, PDCCH #G, and PDCCH #I are received, PDSCH #C is scheduled by the PDCCH #C, PDSCH #G is scheduled by the PDCCH #G, and PDSCH #I is scheduled by the PDCCH #I, the PDCCH #G indicates a second value, and the PDCCH #I indicates a third value, the PDCCH #I indicates transmission of at least HARQ-ACK information #I corresponding to the PDSCH #I on PUCCH #3, in a case that the second value and the third value are different from each other, HARQ-ACK information #G corresponding to the PDSCH #G and the HARQ-ACK information #I are multiplexed on the PUCCH #3, in a case that the second value is equal to the third value, HARQ-ACK information #C corresponding to the PDSCH #C, the HARQ-ACK information #G, and the HARQ-ACK information #I are multiplexed on the PUCCH #3, the HARQ-ACK information #G is new transmission on the PUCCH #3, and the HARQ-ACK information #C is retransmission on the PUCCH #3.

(6) A sixth aspect of the present invention is a communication method used for a terminal apparatus, the communication method including the steps of: receiving a PDCCH and receiving a PDSCH scheduled by the PDCCH; and transmitting (reporting), via a PUCCH or a PUSCH, HARQ-ACK information corresponding to the PDSCH, wherein based at least on the PDCCH, a PDSCH group ID and a toggle bit corresponding to the PDSCH group ID are indicated, in a case that the toggle bit is toggled, HARQ-ACK information being already reported (the HARQ-ACK information other than HARQ-ACK information not being reported yet) is deleted from an HARQ-ACK codebook corresponding to the PDSCH group ID, and the HARQ-ACK information corresponding to the PDSCH scheduled by the PDCCH is included in the HARQ-ACK codebook.

(7) A seventh aspect of the present invention is a communication method used for a base station apparatus, the communication method including the steps of: transmitting a PDCCH and transmitting a PDSCH scheduled by the PDCCH; and receiving, via a PUCCH or a PUSCH, HARQ-ACK information corresponding to the PDSCH, wherein PDCCH #C, PDCCH #G, and PDCCH #I are transmitted, PDSCH #C is scheduled by the PDCCH #C, PDSCH #G is scheduled by the PDCCH #G, and PDSCH #I is scheduled by the PDCCH #I, the PDCCH #G indicates a second value, and the PDCCH #I indicates a third value, the PDCCH #I indicates transmission of at least HARQ-ACK information #I corresponding to the PDSCH #I on PUCCH #3, in a case that the second value and the third value are different from each other, HARQ-ACK information #G corresponding to the PDSCH #G and the HARQ-ACK information #I are multiplexed on the PUCCH #3, in a case that the second value is equal to the third value, HARQ-ACK information #C corresponding to the PDSCH #C, the HARQ-ACK information #G, and the HARQ-ACK information #I are multiplexed on the PUCCH #3, the HARQ-ACK information #G is new transmission on the PUCCH #3, and the HARQ-ACK information #C is retransmission on the PUCCH #3.

(8) An eighth aspect of the present invention is a communication method used for a base station apparatus, the communication method including the steps of transmitting a PDCCH and transmitting a PDSCH scheduled by the PDCCH, wherein based at least on the PDCCH, a PDSCH group ID and a toggle bit corresponding to the PDSCH group ID are indicated, in a case that the toggle bit is toggled, HARQ-ACK information being already reported (the HARQ-ACK information other than HARQ-ACK information not being reported yet) is deleted from an HARQ-ACK codebook corresponding to the PDSCH group ID, and the HARQ-ACK information corresponding to the PDSCH scheduled by the PDCCH is included in the HARQ-ACK codebook.

Advantageous Effects of Invention

According to an aspect of the present invention, the terminal apparatus can efficiently perform communication. The base station apparatus can efficiently perform communication.

BRIEF DESCRIPTION OF DRAWINGS

FIG. 2 is an example illustrating a relationship of $N^{slot}_{symb}$, a subcarrier spacing configuration µ, a slot configuration, and a CP configuration according to an aspect of the present embodiment.

FIG. 8 is a diagram illustrating an example of a procedure of configuration of an HARQ-ACK codebook according to an aspect of the present embodiment.

FIG. 9 is a diagram illustrating an example of a procedure of configuration of an HARQ-ACK codebook according to an aspect of the present embodiment.

FIG. 10 is a diagram illustrating an example of a procedure of configuration of an HARQ-ACK codebook according to an aspect of the present embodiment.

FIG. 12 is an example illustrating a toggle state of an NFI bit according to an aspect of the present embodiment.

FIG. 13 is an example of reporting of the HARQ-ACK information in a case that the NFI bit corresponding to a certain PDSCH group is toggled according to an aspect of the present embodiment.

FIG. 14 is an example of reporting of the HARQ-ACK information in a case that the NFI bit corresponding to a certain PDSCH group is not toggled according to an aspect of the present embodiment.

DESCRIPTION OF EMBODIMENTS

An embodiment of the present invention will be described below.

"A and/or B" may be a term including "A", "B", or "A and B".

The fact that a parameter or information indicates one or multiple values may mean that the parameter or the information includes at least a parameter or information indicating the one or the multiple values. A higher layer parameter may be a single higher layer parameter. The higher layer parameter may be an Information Element (IE) including multiple parameters.

Figure 1:
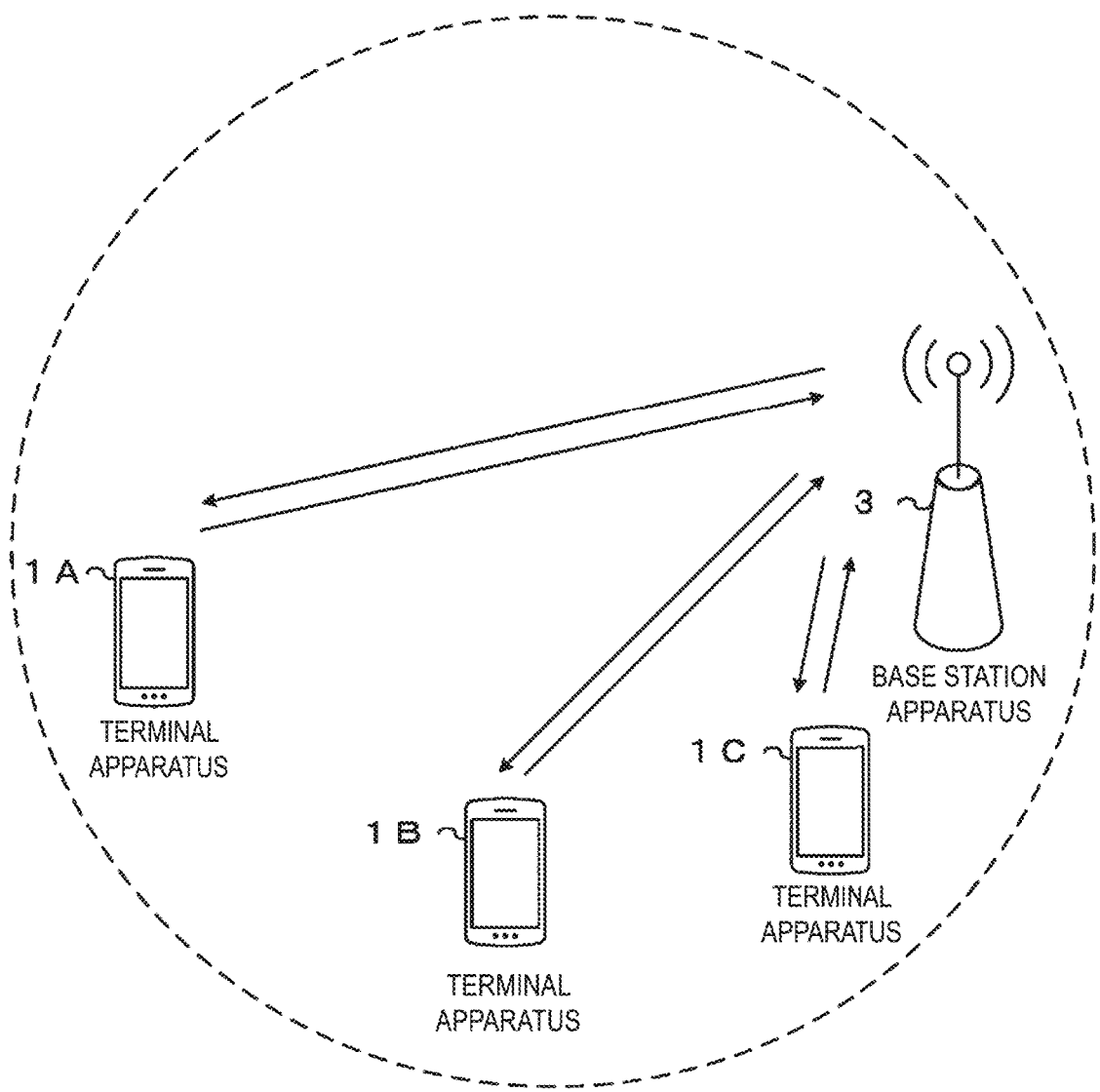
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Hereinafter, each of the terminal apparatuses 1A to 1C is also referred to as a terminal apparatus 1.

The base station apparatus 3 may include one of or both a Master Cell Group (MCG) and a Secondary Cell Group (SCG). The MCG is a group of serving cells at least including a Primary Cell (PCell). The SCG is a group of serving cells including at least a Primary Secondary Cell (PSCell). The PCell may be a serving cell that is given based on initial connection. The MCG may include one or multiple Secondary Cells (SCells). The SCG may include one or multiple SCells. A serving cell identity is a short identity for identifying the serving cell. The serving cell identity may be provided by a higher layer parameter.

In the following, frame configuration will be described.

In the radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol may be converted into a time-continuous signal in baseband signal generation.

A SubCarrier Spacing (SCS) may be provided by a subcarrier spacing $\Delta f = 2^\mu \cdot 15$ kHz. For example, a subcarrier spacing configuration $\mu$ may be configured to be any of 0, 1, 2, 3, 4, and/or 5. For a certain BandWidth Part (BWP), the subcarrier spacing configuration $\mu$ may be provided by a higher layer parameter.

In the radio communication system according to an aspect of the present embodiment, a time unit $T_c$ is used for representing a length of the time domain. The time unit $T_c$ may be given by $T_c = 1/(\Delta f_{max} \cdot N_f)$. $\Delta f_{max}$ may be the maximum value of the subcarrier spacing supported by the radio communication system according to an aspect of the present embodiment. $\Delta f_{max}$ may be $\Delta f_{max} = 480$ kHz. $N_f$ may be $N_f = 4096$. A constant $\kappa$ is $\kappa = \Delta f_{max} \cdot N_f / (\Delta f_{ref} N_{f,ref}) = 64$. $\Delta f_{ref}$ may be 15 kHz. $N_{f,ref}$ may be 2048.

The constant $\kappa$ may be a value indicating a relationship between a reference subcarrier spacing and $T_c$. The constant $\kappa$ may be used for the length of a subframe. Based at least on the constant $\kappa$, the number of slots included in the subframe may be given. $\Delta f_{ref}$ is the reference subcarrier spacing, and $N_{f,ref}$ is a value corresponding to the reference subcarrier spacing.

Downlink transmission and/or uplink transmission includes frames of 10 ms. The frame includes 10 subframes. The length of the subframe is 1 ms. The length of the frame may be provided regardless of the subcarrier spacing $\Delta f$. In other words, the frame configuration may be provided regardless of $\mu$. The length of the subframe may be provided regardless of the subcarrier spacing $\Delta f$. In other words, the configuration of the subframe may be provided regardless of $\mu$.

For a certain subcarrier spacing configuration $\mu$, the number and indexes of slots included in a subframe may be provided. For example, a first slot number $n^\mu_s$ may be provided in ascending order ranging from 0 to $N^{subframe, \mu}_{slot} - 1$ within a subframe. For the subcarrier spacing configuration $\mu$, the number and indexes of slots included in a frame may be provided. For example, a second slot number $n^\mu_{s, f}$ may be provided in ascending order ranging from 0 to $N^{frame, \mu}_{slot} - 1$ within a frame. $N^{slot}_{symb}$ continuous OFDM symbols may be included in one slot. $Ns^{l'}_{symb}$ may be provided based at least on a part or an entirety of a slot configuration and/or a Cyclic Prefix (CP) configuration. The slot configuration may be provided at least by a higher layer parameter tdd-UL-DL-Configuration-Common. The CP configuration may be provided based at least on a higher layer parameter. The CP configuration may be given based at least on dedicated RRC signaling. Each of the first slot number and the second slot number is also referred to as slot number (slot index).

FIG. 2 is an example illustrating a relationship of $N^{slot}_{symb}$, a subcarrier spacing configuration $\mu$, and a CP configuration according to an aspect of the present embodiment. In FIG. 2A, for example, the subcarrier spacing configuration $\mu$ is two, and the CP configuration is a normal cyclic prefix (normal CP), $N^{slot}_{symb} = 14$, $N^{frame, \mu}_{slot} = 40$, and $N^{subframe, \mu}_{slot} = 4$. In FIG. 2B, for example, the subcarrier spacing configuration $\mu$ is two, and the CP configuration is an extended cyclic prefix (extended CP), $N^{slot}_{symb} = 12$, $N^{frame, \mu}_{slot} = 40$, and $N^{subframe, \mu}_{slot} = 4$.

Physical resources will be described below.

An antenna port is defined in a manner in which a channel through which a symbol is transmitted in one antenna port can be estimated from a channel through which another symbol is transmitted in the same antenna port. In a case that a large scale property of a channel through which a symbol is transmitted at one antenna port can be estimated from a channel through which a symbol is transmitted at another antenna port, the two antenna ports are referred to as Quasi Co-Located (QCL). The large scale property may at least include long term performance of a channel The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a receiver for the first antenna port and a receive beam assumed by the receiver for the second antenna port are the same. The fact that the first antenna port and the second antenna port are QCL with respect to a beam parameter may mean that a transmit beam assumed by a receiver for the first antenna port and a transmit beam assumed by the receiver for the second antenna port are the same. In a case that the large scale property of a channel through which a symbol is transmitted in one antenna port can be estimated from a channel through which a symbol is transmitted in another antenna port, the terminal apparatus 1 may assume that the two antenna ports are QCL. The fact that two antenna ports are QCL may mean that it is assumed that the two antenna ports are QCL.

For each set of a subcarrier spacing configuration and a carrier, a resource grid including $N^\mu_{RB, x} N^{RB}_{sc}$ subcarriers and $N^{(\mu)}_{symb} N^{subframe, \mu}_{symb}$ OFDM symbols is provided. $N^\mu_{RB,x}$ may indicate the number of resource blocks provided for the subcarrier spacing configuration $\mu$ for a carrier x. $N^\mu_{RB, x}$ may indicate the maximum number of resource blocks provided for the subcarrier spacing configuration $\mu$ for the carrier x. The carrier x indicates either a downlink carrier or an uplink carrier. In other words, x is "DL" or "UL". $N^\mu_{RB}$ is a name including $N^\mu_{RB, DL}$ and/or $N^\mu_{RB, UL}$.

$N^{RB}{}_{sc}$ may indicate the number of subcarriers included in one resource block. At least one resource grid may be provided for each antenna port p and/or for each subcarrier spacing configuration µ and/or for each Transmission direction configuration. The transmission direction at least includes a DownLink (DL) and an UpLink (UL). Hereinafter, a set of parameters including at least some or all of the antenna port p, the subcarrier spacing configuration µ, and the transmission direction configuration is also referred to as a first radio parameter set. In other words, one resource grid may be provided for each first radio parameter set.

In the downlink, a carrier included in a serving cell is referred to as a downlink carrier (or a downlink component carrier). In the uplink, a carrier included in a serving cell is referred to as an uplink carrier (uplink component carrier). A downlink component carrier and an uplink component carrier are collectively referred to as a component carrier (or a carrier).

Each element in the resource grid provided for each first radio parameter set is referred to as a resource element. The resource element is identified by an index $k_{sc}$ in the frequency domain and an index $l_{sym}$ in the time domain. For a certain first radio parameter set, the resource element is identified by the index $k_{sc}$ in the frequency domain and the index $l_{sym}$ in the time domain The resource element to be identified by the index $k_{sc}$ of the frequency domain and the index $l_{sym}$ of the time domain is also referred to as a resource element ($k_{sc}$, $l_{sym}$). The index $k_{sc}$ of the frequency domain indicates any value from 0 to $N^{\mu}{}_{RB}N^{RB}{}_{sc}-1$. $N^{\mu}{}_{RB}$ may be the number of resource blocks provided for the subcarrier spacing configuration µ. $N^{\mu}{}_{RB}$ is the number of subcarriers included in the resource block, and $N^{RB}{}_{sc}=12$. The index $k_{sc}$ in the frequency domain may correspond to the subcarrier index $k_{sc}$. The index $l_{sym}$ in the time domain may correspond to the OFDM symbol index $l_{sym}$.

Figure 3:
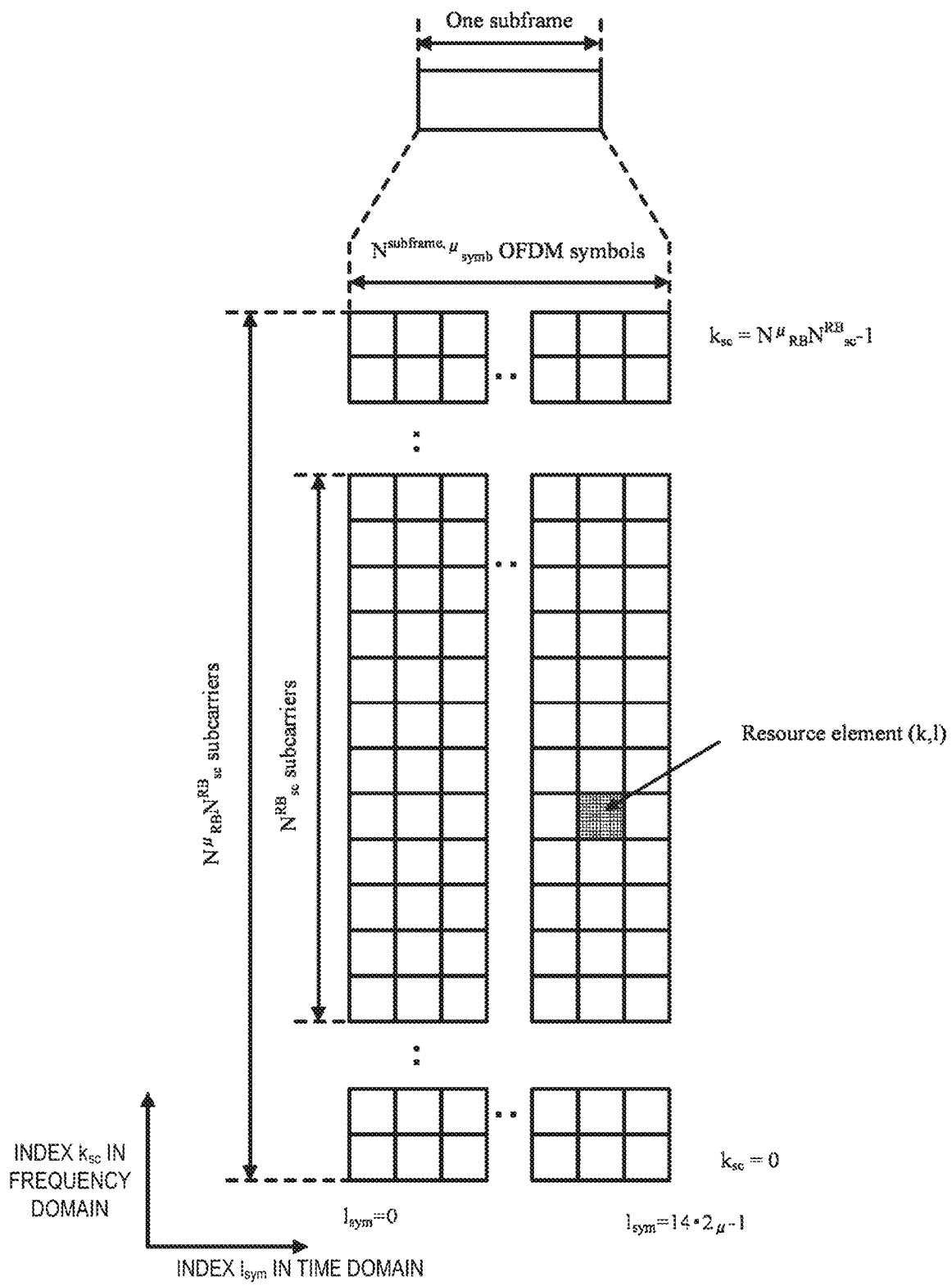
FIG. 3 is a schematic diagram illustrating an example of a resource grid in a subframe according to an aspect of the present embodiment.

FIG. 3 is a schematic diagram illustrating an example of the resource grid in the subframe according to an aspect of the present embodiment. In the resource grid of FIG. 3, the horizontal axis is the index $l_{sym}$ in the time domain, and the vertical axis is the index $k_{sc}$ in the frequency domain. In one subframe, the frequency domain of the resource grid includes $N^{\mu}{}_{RB}N^{RB}{}_{sc}$ subcarriers. In one subframe, the time domain of the resource grid may include $14 \cdot 2^{\mu}$ OFDM symbols. One resource block includes $N^{RB}{}_{sc}$ subcarriers. The time domain of the resource block may correspond to 1 OFDM symbol. The time domain of the resource block may correspond to 14 OFDM symbols. The time domain of the resource block may correspond to one or multiple slots. The time domain of the resource block may correspond to one subframe.

For the terminal apparatus 1, performing transmission and/or reception by using only a subset of resource grids may be indicated. The subset of resource grids is also referred to as a BWP, and the BWP may be provided based at least on a part or an entirety of the higher layer parameter and/or DCI. The BWP is also referred to as a bandwidth part (BP). In other words, the terminal apparatus 1 may not receive an indication of transmission and/or reception using all sets of resource grids. In other words, the terminal apparatus 1 may receive an indication of transmission and/or reception using some frequency resources within the resource grid. One BWP may include multiple resource blocks in the frequency domain. One BWP may include multiple contiguous resource blocks in the frequency domain. A BWP configured for a downlink carrier is also referred to as a downlink BWP. A BWP configured for an uplink carrier is also referred to as an uplink BWP.

One or multiple downlink BWPs may be configured for the terminal apparatus 1. The terminal apparatus 1 may attempt to receive a physical channel (for example, a PDCCH, a PDSCH, and/or an SS/PBCH) in one downlink BWP out of the one or multiple downlink BWPs. The one downlink BWP is also referred to as an active downlink BWP.

One or multiple uplink BWPs may be configured for the terminal apparatus 1. The terminal apparatus 1 may attempt to transmit a physical channel (for example, a PUCCH, a PUSCH, and/or a PRACH) in one uplink BWP out of the one or multiple uplink BWPs. The one uplink BWP is also referred to as an active uplink BWP.

A set of downlink BWPs may be configured for each serving cell. The set of downlink BWPs may include one or multiple downlink BWPs. A set of uplink BWPs may be configured for each serving cell. The set of uplink BWPs may include one or multiple uplink BWPs.

A higher layer parameter is a parameter included in a higher layer signaling. The higher layer signaling may be a Radio Resource Control (RRC) signaling, or may be a Medium Access Control Control Element (MAC CE). Here, the higher layer signaling may be a signal of an RRC layer, or may be a signal of an MAC layer.

The higher layer signaling may be common RRC signaling. The common RRC signaling may at least include a part or all of the following feature C1 to feature C3. Feature C1) Being mapped to a BCCH logical channel or a CCCH logical channel Feature C2) Including at least a radioResourceConfig-Common information element Feature C3) Being mapped to a PBCH The radioResourceConfigCommon information element may include information indicating a configuration commonly used in a serving cell. The configuration used in a serving cell in common may at least include configuration of the PRACH. The configuration of the PRACH may at least indicate one or multiple random access preamble indexes. The configuration of the PRACH may at least indicate time/frequency resources of the PRACH.

The higher layer signaling may be dedicated RRC signaling. The dedicated RRC signaling may at least include a part or all of the following features D1 to D2. Feature D1) Being mapped to a DCCH logical channel Feature D2) Including at least a radioResourceConfigDedicated information element The radioResourceConfigDedicated information element may include at least information indicating a configuration specific to the terminal apparatus 1. The radioResourceConfigDedicated information element may include at least information indicating a BWP configuration. The BWP configuration may indicate at least a frequency resource of the BWP.

For example, a MIB, first system information, and second system information may be included in the common RRC signaling. In addition, a higher layer message that is mapped to the DCCH logical channel and includes at least radioResourceConfigCommon may be included in the common RRC signaling. In addition, a higher layer message that is mapped to the DCCH logical channel and does not include the radioResourceConfigCommon information element may be included in the dedicated RRC signaling. In addition, a higher layer message that is mapped to the DCCH logical channel and includes at least the radioResourceConfigDedicated information element may be included in the dedicated RRC signaling.

The first system information may indicate at least a time index of a Synchronization Signal (SS) block. The SS block is also referred to as an SS/PBCH block. The SS/PBCH block is also referred to as an SS/PBCH. The first system information may include at least information related to a PRACH resource. The first system information may include at least information related to a configuration of initial connection. The second system information may be system information other than the first system information.

The radioResourceConfigDedicated information element may include at least information related to a PRACH resource. The radioResourceConfigDedicated information element may include at least information related to the configuration of initial connection.

In the following, physical channels and physical signals according to various aspects of the present embodiment will be described.

The uplink physical channel may correspond to a set of resource elements for carrying information that is generated in a higher layer. The uplink physical channel is a physical channel that is used in the uplink carrier. In the radio communication system according to an aspect of the present embodiment, at least a part or all of the following uplink physical channels are used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The uplink control information includes some or all of Channel State Information (CSI), a Scheduling Request (SR), and a Hybrid Automatic Repeat request ACKnowledgement (HARQ-ACK) corresponding to a transport block (TB, a Medium Access Control Protocol Data Unit (MAC PDU), Downlink-Shared Channel (DL-SCH), and/or a Physical Downlink Shared Channel (PDSCH)).

The HARQ-ACK may include at least an HARQ-ACK bit corresponding at least to one transport block. The HARQ-ACK bit may indicate an acknowledgement (ACK) or a negative-acknowledgement (NACK) corresponding to one or multiple transport blocks. The HARQ-ACK may include at least an HARQ-ACK codebook including one or multiple HARQ-ACK bits. The fact that the HARQ-ACK bit corresponds to one or multiple transport blocks may mean that the HARQ-ACK bit corresponds to a PDSCH including the one or the multiple transport blocks. The HARQ-ACK bit may indicate an ACK or NACK corresponding to one Code Block Group (CBG) included in the transport block.

The Scheduling Request (SR) may be used at least for requesting a resource of a PUSCH for initial transmission. A scheduling request bit may be used to indicate either a positive SR or a negative SR. The scheduling request bit indicating the positive SR is also referred to as "the positive SR being transmitted". The positive SR may indicate that resources of the PUSCH for initial transmission are requested by the terminal apparatus 1. The positive SR may indicate that a scheduling request is triggered by the higher layer. The positive SR may be transmitted in a case that the higher layer indicates transmission of the scheduling request. The scheduling request bit indicating the negative SR is also referred to as "the negative SR being transmitted". The negative SR may indicate that resources of the PUSCH for initial transmission are not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least some or all of a Channel Quality Indicator (CQI), a Precoder Matrix Indicator (PMI), and a Rank Indicator (RI). The CQI is an indicator related to quality of a channel (for example, propagation intensity), and the PMI is an indicator indicating a precoder. The RI is an indicator indicating a transmission rank (or the number of transmission layers).

The PUCCH supports PUCCH formats (PUCCH formats 0 to 4). The PUCCH formats may be mapped to the PUCCH and may then be transmitted. The PUCCH format may be transmitted on the PUCCH. The fact that the PUCCH format is transmitted may mean that the PUCCH is transmitted.

The PUSCH may be used at least to transmit a transport block ((TB), the MAC PDU, a UL-SCH, and/or the PUSCH). The PUSCH may be used to transmit at least some or all of the transport block, the HARQ-ACK, the channel state information, and the scheduling request. The PUSCH is used at least to transmit a random access message 3.

The PRACH is used at least to transmit a random access preamble (random access message 1). The PRACH may be used at least to indicate some or all of an initial connection establishment procedure, a handover procedure, a connection re-establishment procedure, synchronization for PUSCH transmission (timing adjustment), and a resource request for the PUSCH. The random access preamble may be used for notifying an index (random access preamble index) that is given by a higher layer of the terminal apparatus 1 to the base station apparatus 3.

In FIG. 1, in uplink radio communication, the following uplink physical signals are used. The uplink physical signals need not be used for transmitting information output from a higher layer, but are used by a physical layer.

UpLink Demodulation Reference Signal (UL DMRS)
Sounding Reference Signal (SRS)
UpLink Phase Tracking Reference Signal (UL PTRS)

The UL DMRS is related to transmission of the PUSCH and/or the PUCCH. The UL DMRS is multiplexed on the PUSCH or the PUCCH. The base station apparatus 3 may use the UL DMRS for performing channel compensation of the PUSCH or the PUCCH. In the following, concurrent transmission of the PUSCH and the UL DMRS related to the PUSCH is simply referred to as transmission of the PUSCH. In the following, concurrent transmission of the PUCCH and the UL DMRS related to the PUCCH is simply referred to as transmission of the PUCCH. The UL DMRS related to the PUSCH is also referred to as the UL DMRS for the PUSCH. The UL DMRS related to the PUCCH is also referred to as the UL DMRS for the PUCCH.

The SRS need not be related to transmission of the PUSCH or the PUCCH. The base station apparatus 3 may use the SRS for measurement of a channel state. The SRS may be transmitted at the end of a subframe in an uplink slot or in a certain number of OFDM symbols from the end.

The UL PTRS may be a reference signal that is at least used for phase tracking. The UL PTRS may be related to a UL DMRS group at least including an antenna port used for one or multiple UL DMRSs. The fact that the UL PTRS and the UL DMRS group are related to each other may mean that an antenna port of the UL PTRS and a part or all of antenna ports included in the UL DMRS group are at least QCL. The UL DMRS group may be identified based at least on an antenna port having the smallest index in the UL DMRSs included in the UL DMRS group. The UL PTRS may be mapped to an antenna port having the smallest index in one or multiple antenna ports to which one codeword is mapped. The UL PTRS may be mapped to the first layer in a case that one codeword is at least mapped to the first layer and the second layer. The UL PTRS need not be mapped to the second layer. The index of the antenna port to which the UL PTRS is mapped may be given based at least on downlink control information.

In FIG. 1, in downlink radio communication from the base station apparatus 3 to the terminal apparatus 1, the following downlink physical channels are used. The downlink physical channels are used by a physical layer for transmitting information output from a higher layer.

Physical Broadcast Channel (PBCH)
Physical Downlink Control Channel (PDCCH)
Physical Downlink Shared Channel (PDSCH)

The PBCH is used at least to transmit a Master Information Block ((MIB), and/or a Broadcast Channel(BCH)). The PBCH may be transmitted based on a prescribed transmission interval. The PBCH may be transmitted at an interval of 80 ms. The PBCH may be transmitted at intervals of 160 ms. Contents of information included in the PBCH may be updated at every 80 ms. A part or an entirety of the information included in the PBCH may be updated at every 160 ms. The PBCH may include 288 subcarriers. The PBCH may include 2, 3, or 4 OFDM symbols. The MIB may include information associated with an identifier (index) of a synchronization signal. The MIB may include information indicating at least a part of a number of the slot, a number of a subframe, and/or a number of a radio frame in which the PBCH is transmitted.

The PDCCH is used at least to transmit Downlink Control Information (DCI). The PDCCH may be transmitted with at least the downlink control information included therein. The PDCCH may include the downlink control information. The downlink control information is also referred to as a DCI format. The downlink control information may include at least either a downlink grant or an uplink grant. The DCI format used for scheduling the PDSCH is also referred to as a downlink DCI format. The DCI format used for scheduling the PUSCH is also referred to as an uplink DCI format. The downlink grant is also referred to as downlink assignment or downlink allocation. The uplink DCI format at least includes one or both of DCI format 0_0 and DCI format 0_1.

DCI format 0_0 includes at least some or all of 1A to 1F.
1A) DCI format identification field (Identifier for DCI formats field)
1B) Frequency domain resource allocation field (Frequency domain resource assignment field)
1C) Time domain resource allocation field (Time domain resource assignment field)
1D) Frequency hopping flag field
1E) Modulation and Coding Scheme field (MCS field)

The DCI format specification field may be used at least to indicate which of one or multiple DCI formats the DCI format including the DCI format specification field corresponds to. The one or multiple DCI formats may be given based at least on a part or all of DCI format 1_0, DCI format 1_1, DCI format 0_0, and/or DCI format 0_1.

The frequency domain resource assignment field may be used at least to indicate assignment of a frequency resource for the PUSCH scheduled by the DCI format including the frequency domain resource assignment field. The frequency domain resource assignment field is also referred to as Frequency Domain Resource Allocation (FDRA) field.

The time domain resource assignment field may be used at least to indicate assignment of a time resource for the PUSCH scheduled by the DCI format including the time domain resource assignment field.

The frequency hopping flag field may be used at least to indicate whether frequency hopping is to be applied to the PUSCH scheduled by the DCI format including the frequency hopping flag field.

The MCS field may be used at least to indicate some or all of a modulation scheme for the PUSCH scheduled by the DCI format including the MCS field and/or a target coding rate. The target coding rate may be a target coding rate for a transport block of the PUSCH. The size of the transport block (Transport Block Size (TBS)) may be provided based at least on the target coding rate.

DCI format 0_1 includes at least some or all of 2A to 2G.
2A) DCI format identification field
2B) Frequency domain resource allocation field
2C) Time domain resource allocation field
2D) Frequency hopping flag field
2E) MCS field
2F) CSI request field
2G) BWP field
2H) First UL DAI field ($1^{st}$ downlink assignment index)
2I) Second UL DAI field ($2^{nd}$ downlink assignment index)

The first UL DAI field is used at least for indicating a transmission state of the PDSCH. In a case that a Dynamic HARQ-ACK codebook is used, the size of the first UL DAI field may be 2 bits.

The second UL DAI field is used at least for indicating a transmission state of the PDSCH. In a case that the dynamic HARQ-ACK codebook including two sub-codebooks is used, the size of the second UL DAI field may be 2 bits.

The BWP field may be used for indicating an uplink BWP to which the PUSCH that is scheduled by DCI format 0_1 is mapped.

The CSI request field is at least used for indicating the report of the CSI. The size of the CSI request field may be given based at least on a higher layer parameter ReportTriggerSize.

The downlink DCI format at least includes one or both of DCI format 1_0 and DCI format DCI format 1_0 includes at least some or all of 3A to 3H.
3A) DCI format identification field (Identifier for DCI formats field)
3B) Frequency domain resource allocation field (Frequency domain resource assignment field)
3C) Time domain resource allocation field (Time domain resource assignment field)
3D) Frequency hopping flag field
3E) Modulation and Coding Scheme field (MCS field)
3F) First CSI request field (First CSI request field)
3G) PDSCH-to-HARQ feedback timing indicator field
3H) PUCCH resource indication field (PUCCH resource indicator field)

The timing indicator field from the PDSCH to the HARQ feedback may be a field indicating a timing K1. In a case that the index of the slot including the last OFDM symbol of the PDSCH is a slot n, the index of the slot including the PUCCH or the PUSCH including at least HARQ-ACK corresponding to the transport block included in the PDSCH may be n+K1. In a case that the index of the slot including the last OFDM symbol of the PDSCH is a slot n, the index of the slot including the OFDM symbol at the head of the PUCCH or the OFDM symbol at the head of the PUSCH including at least HARQ-ACK corresponding to the transport block included in the PDSCH may be n+K1.

The PDSCH-to-HARQ feedback timing indicator field (PDSCH-to-HARQ_feedback timing indicator field) may be hereinafter referred to as an HARQ indicator field.

The PUCCH resource indicator field may be a field indicating indexes of one or multiple PUCCH resources included in the PUCCH resource set.

DCI format 1_1 includes at least some or all of 4A to 4J.
4A) DCI format specification field (Identifier for DCI formats field)
4B) Frequency domain resource allocation field (Frequency domain resource assignment field)
4C) Time domain resource assignment field
4D) Frequency hopping flag field
4E) Modulation and Coding Scheme field (MCS field)
4F) First CSI request field
4G) PDSCH-to-HARQ feedback timing indicator field
4H) PUCCH resource indicator field
4J) BWP field
4K) PGI field (PDSCH Group Indicator field)
4L) RPG field (Requested PDSCH Group field)
4M) NFI field (New Feedback Indicator field)

The BWP field may be used to indicate the downlink BWP to which the PDSCH scheduled by DCI format 1_1 is mapped.

The PGI field, the RPG field, and the NFI field will be described later.

DCI format 2_0 may at least include one or multiple Slot Format Indicators (SFIs).

Each DCI format (DCI format 1_0, DCI format 1_1, DCI format 0_0, and/or DCI format 0_1 DCI format 1_1) may include a field different from the fields described above.

In various aspects of the present embodiment, the number of resource blocks indicates the number of resource blocks in the frequency domain unless otherwise specified.

The downlink grant is used at least for scheduling a single PDSCH in a single serving cell.

The uplink grant is used at least for scheduling a single PUSCH in a single serving cell.

One physical channel may be mapped to one serving cell. A single physical channel may be mapped to a single BWP configured to a single carrier included in a single serving cell.

In the terminal apparatus 1, one or multiple COntrol REsource SETs (CORESETs) may be configured. The terminal apparatus 1 monitors the PDCCH in the one or multiple control resource sets. Here, monitoring of the PDCCH in the one or multiple control resource sets may include monitoring of one or multiple PDCCHs corresponding to the one or multiple control resource sets, respectively. Note that the PDCCH may include a set of one or multiple PDCCH candidates and/or one or multiple PDCCH candidates. Also, monitoring of the PDCCH may include monitoring and detecting the PDCCH and/or a DCI format transmitted via the PDCCH.

The control resource set may indicate a time-frequency domain to which one or multiple PDCCHs can be mapped. The control resource set may be an area in which the terminal apparatus 1 monitors the PDCCH. The control resource set may include continuous resources (Localized resources). The control resource set may include non-continuous resources (distributed resources).

In the frequency domain, the unit of mapping of the control resource set may be a resource block. In the frequency domain, for example, the unit of mapping of the control resource set may be six resource blocks. In the time domain, the unit of mapping of the control resource set may be an OFDM symbol. In the time domain, for example, the unit of mapping of the control resource set may be one OFDM symbol.

Mapping of the control resource set to the resource block may be provided based at least on the higher layer parameter. The higher layer parameter may include a bitmap for a Resource Block Group (RBG). The resource block group may be provided by six continuous resource blocks.

The number of OFDM symbols included in the control resource set may be provided based at least on the higher layer parameter.

A certain control resource set may be a Common control resource set. The common control resource set may be a control resource set configured commonly to multiple terminal apparatuses 1. The common control resource set may be provided at least based on some or all of the MIB, the first system information, the second system information, the common RRC signaling, and a cell ID. For example, the time resource and/or the frequency resource of the control resource set configured to monitor the PDCCH to be used for scheduling the first system information may be provided based at least on the MIB.

The control resource set configured by the MIB is also referred to as CORESET#0. CORESET#0 may be a control resource set of index#0.

A certain control resource set may be a Dedicated control resource set. The dedicated control resource set may be a control resource set configured to be used exclusively for the terminal apparatus 1. The dedicated control resource set may be provided based at least on some or all of the dedicated RRC signaling and values of C-RNTI. Multiple control resource sets may be configured for the terminal apparatus 1, and an index (control resource set index) may be provided for each of the control resource sets. One or more control channel elements (CCEs) may be configured in the control resource set, and an index (CCE index) may be provided for each of the CCEs.

A set of candidates of the PDCCH monitored by the terminal apparatus 1 may be defined from the perspective of a search space. In other words, the set of PDCCH candidates monitored by the terminal apparatus 1 may be given by a search space.

The search space may include one or multiple PDCCH candidates of one or multiple Aggregation levels. The aggregation level of the PDCCH candidates may indicate the number of CCEs constituting the PDCCH. The PDDCH candidate may be mapped to one or multiple CCEs.

The terminal apparatus 1 may monitor at least one or multiple search spaces in the slot in which DRX (Discontinuous reception) is not configured. The DRX may be provided based at least on a higher layer parameter. The terminal apparatus 1 may monitor at least one or multiple Search space sets in the slot in which DRX is not configured. Multiple search space sets may be configured for the terminal apparatus 1. An index (search space set index) may be provided for each of the search space sets.

The search space set may at least include one or multiple search spaces. An index (search space index) may be provided for each of the search spaces.

Each search space set may be associated at least with one control resource set. Each search space set may be included in one control resource set. For each of the search space sets, the index of the control resource set related to the search space set may be given.

For each of the search space sets, a monitoring interval (Monitoring periodicity) of the search space set may be configured. The monitoring interval of the search space set may at least indicate the interval of the slot in which monitoring of the search space set is performed by the terminal apparatus 1. A higher layer parameter at least indicating the monitoring interval of the search space set may be given for each search space set.

For each of the search space sets, a Monitoring offset of the search space set may be configured. The monitoring offset of the search space set may at least indicate an offset from a reference index (for example, slot #0) of an index of a slot in which monitoring of the search space set is performed by the terminal apparatus 1. A higher layer parameter at least indicating the monitoring offset of the search space set may be given for each search space set.

For each of the search space sets, a Monitoring pattern of the search space set may be configured. The monitoring pattern of the search space set may indicate the first OFDM symbol for the search space set in which monitoring is performed. The monitoring pattern of the search space set may be given by a bitmap indicating the first OFDM symbol in one or multiple slots. A higher layer parameter at least indicating the monitoring pattern of the search space set may be given for each search space set.

A Monitoring occasion for the search space set may be given based at least on a part or all of the monitoring interval of the search space set, the monitoring offset of the search space set, the monitoring pattern of the search space set, and/or configuration of DRX.

Figure 4:
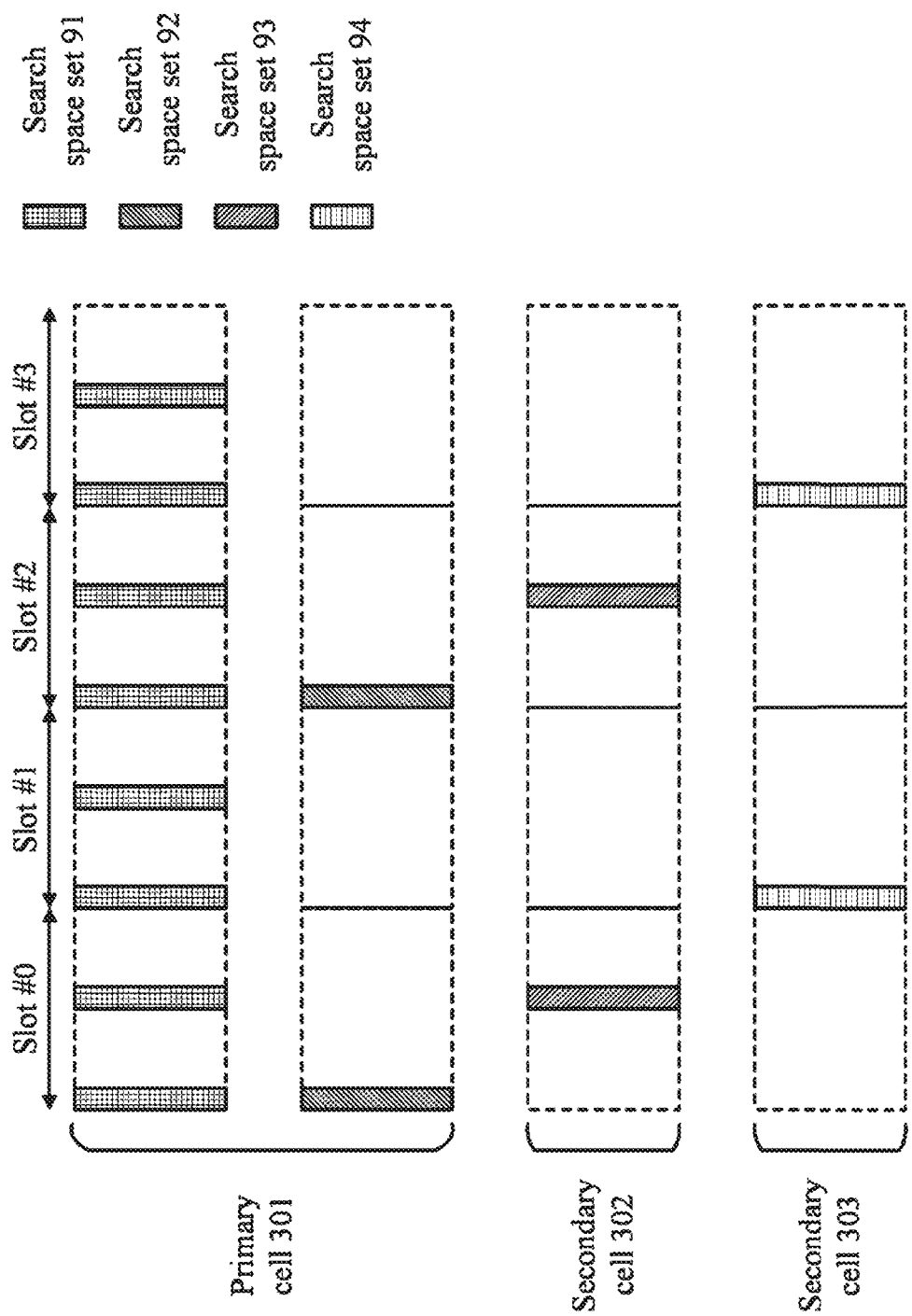
FIG. 4 is a diagram illustrating an example of monitoring occasions of search space sets according to an aspect of the present embodiment.

FIG. 4 is a diagram illustrating an example of the monitoring occasion for the search space set according to an aspect of the present embodiment. In FIG. 4, a search space set 91 and a search space set 92 are configured in a primary cell 301, a search space set 93 is configured in a secondary cell 302, and a search space set 94 is configured in a secondary cell 303.

In FIG. 4, each block hatched with grid lines represents the search space set 91, each block hatched with lines rising diagonally up and to the right represents the search space set 92, each block hatched with lines rising diagonally up and to the left represents the search space set 93, and each block hatched with horizontal lines represents the search space set 94.

The monitoring interval of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0, 0]. In other words, the monitoring occasion for the search space set 91 is the first OFDM symbol (OFDM symbol #0) and the eighth OFDM symbol (OFDM symbol #7) in each of the slots.

The monitoring interval of the search space set 92 is set to two slots, the monitoring offset of the search space set 92 is set to zero slots, and the monitoring pattern of the search space set 92 is set to [1, 0, 0, 0, 0, 0, 0, 0, 0, 0, 0, 0, 0, 0]. In other words, the monitoring occasion for the search space set 92 is the first OFDM symbol (OFDM symbol #0) in each of the even-numbered slots.

The monitoring interval of the search space set 93 is set to two slots, the monitoring offset of the search space set 93 is set to zero slots, and the monitoring pattern of the search space set 93 is set to [0, 0, 0, 0, 0, 0, 0, 1, 0, 0, 0, 0, 0, 0]. In other words, the monitoring occasion for the search space set 93 is the eighth OFDM symbol (OFDM symbol #7) in each of the even-numbered slots.

The monitoring interval of the search space set 94 is set to two slots, the monitoring offset of the search space set 94 is set to one slot, and the monitoring pattern of the search space set 94 is set to [1, 0, 0, 0, 0, 0, 0, 0, 0, 0, 0, 0, 0, 0]. In other words, the monitoring occasion for the search space set 94 is the first OFDM symbol (OFDM symbol #0) in each of the odd-numbered slots.

The physical resources of the search space include configuration units (Control Channel Elements (CCEs)) of a control channel The CCE includes a prescribed number of Resource Element Groups (REGs). For example, the CCE may include six REGs. The REG may include one Physical Resource Block (PRB) during one OFDM symbol. In other words, the REG may include 12 Resource Elements (REs). The PRB is also simply referred to as a Resource Block (RB).

The PDSCH is used at least to transmit the transport block. The PDSCH may be used at least to transmit a random access message 2 (random access response). The PDSCH may be used at least to transmit system information including parameters used for initial access.

In FIG. 1, in downlink radio communication, the following downlink physical signals are used. The downlink physical signals need not be used for transmitting information output from a higher layer, but are used by a physical layer.
Synchronization signal (SS)
DownLink DeModulation Reference Signal (DL DMRS)
Channel State Information-Reference Signal (CSI-RS)
DownLink Phase Tracking Reference Signal (DL PTRS)

The synchronization signal is used by the terminal apparatus 1 to establish synchronization with a downlink frequency domain and/or time domain The synchronization signal includes a Primary Synchronization Signal (PSS) and a Secondary Synchronization Signal (SSS).

An SS block (SS/PBCH block) includes at least some or all of the PSS, the SSS, and the PBCH.

The DL DMRS is related to transmission of the PBCH, the PDCCH, and/or the PDSCH. The DL DMRS is multiplexed on the PBCH, the PDCCH, and/or the PDSCH. In order to channel compensation of the PBCH, the PDCCH, or the PDSCH, the terminal apparatus 1 may use the DL DMRS corresponding to the PBCH, the PDCCH, or the PDSCH.

The CSI-RS may be a signal used at least to calculate channel state information. A pattern of the CSI-RS assumed by the terminal apparatus may be provided at least by a higher layer parameter.

The PTRS may be a signal that is at least used for compensation of phase noise. A pattern of the PTRS assumed by the terminal apparatus may be provided based at least on a higher layer parameter and/or the DCI.

The DL PTRS may be related to the DL DMRS group at least including an antenna port used for one or multiple DL DMRSs.

The downlink physical channel and the downlink physical signal are also collectively referred to as the downlink signal. The uplink physical channel and the uplink physical signal are also collectively referred to as the uplink signal. The downlink signal and the uplink signal are also collectively referred to as the physical signal. The downlink signal and the uplink signal are also collectively referred to as the signal. The downlink physical channel and the uplink physical channel are collectively referred to as the physical channel. The downlink physical signal and the uplink physical signal are collectively referred to as the physical signal.

A Broadcast CHannel (BCH), an Uplink-Shared CHannel (UL-SCH), and a Downlink-Shared CHannel (DL-SCH) are transport channels. A channel used in a Medium Access Control (MAC) layer is referred to as a transport channel A unit of the transport channel used in the MAC layer is also referred to as a transport block (TB) or an MAC PDU. Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 exchange (transmit and/or receive) a higher layer signaling in a higher layer. For example, the base station apparatus 3 and the terminal apparatus 1 may transmit and/or receive, in a Radio Resource Control (RRC) layer, RRC signaling (a Radio Resource Control (RRC) message and/or Radio Resource Control (RRC) information). The base station apparatus 3 and the terminal apparatus 1 may transmit and/or receive a MAC Control Element (CE) in the MAC layer. Here, the RRC signaling and/or the MAC CE is also referred to as a higher layer signaling.

The PUSCH and the PDSCH may be at least used for transmitting the RRC signaling and/or the MAC CE. Here, the RRC signaling transmitted on the PDSCH from the base station apparatus 3 may be signaling that is common to multiple terminal apparatuses 1 in a serving cell. The signaling common to the multiple terminal apparatuses 1 in the serving cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A serving cell-specific higher layer parameter may be transmitted using the signaling common to the multiple terminal apparatuses 1 in the serving cell or the signaling dedicated to a certain terminal apparatus 1. A UE-specific higher layer parameter may be transmitted using signaling dedicated to a certain terminal apparatus 1.

A Broadcast Control CHannel (BCCH), a Common Control CHannel (CCCH), and a Dedicated Control CHannel (DCCH) are logical channels. For example, the BCCH is a channel of a higher layer that is used for transmitting the MIB. The Common Control CHannel (CCCH) is a channel of a higher layer that is used for transmitting common information in multiple terminal apparatuses 1. Here, the CCCH may be, for example, used for the terminal apparatus 1 that is not in a state of RRC connection. The Dedicated Control CHannel (DCCH) is a channel of a higher layer that is at least used for transmitting control information (dedicated control information) that is dedicated to the terminal apparatus 1. Here, the DCCH may be, for example, used for the terminal apparatus 1 that is in a state of RRC connection.

The BCCH in the logical channel may be mapped to the BCH, the DL-SCH, or the UL-SCH in the transport channel The CCCH in the logical channel may be mapped to the DL-SCH or the UL-SCH in the transport channel The DCCH in the logical channel may be mapped to the DL-SCH or the UL-SCH in the transport channel The UL-SCH in the transport channel may be mapped to the PUSCH in the physical channel The DL-SCH in the transport channel may be mapped to the PDSCH in the physical channel The BCH in the transport channel may be mapped to the PBCH in the physical channel.

In the following, a configuration example of the terminal apparatus 1 according to an aspect of the present embodiment will be described.

Figure 5:
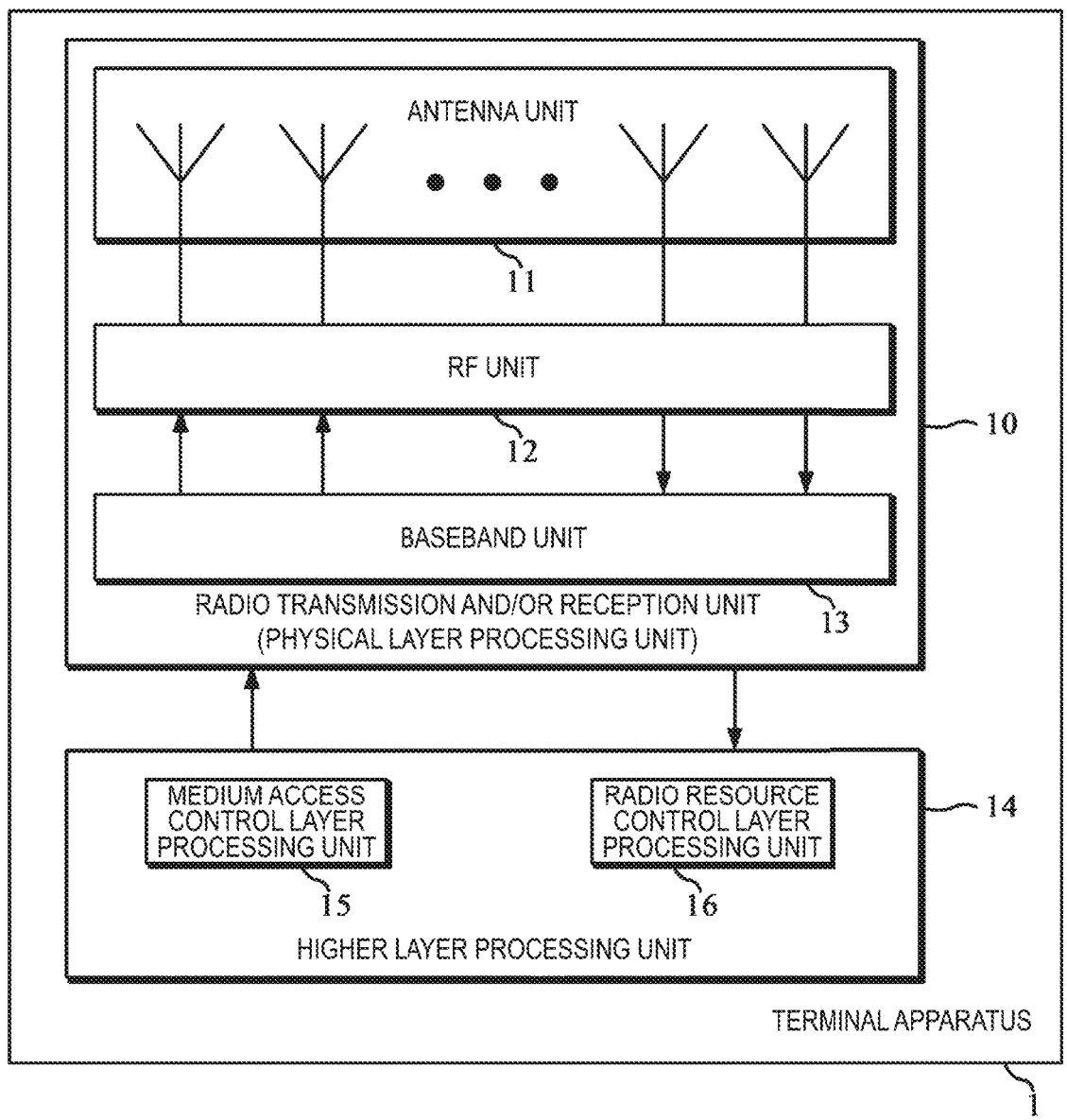
FIG. 5 is a schematic block diagram illustrating a configuration of a terminal apparatus 1 according to an aspect of the present embodiment.

FIG. 5 is a schematic block diagram illustrating a configuration of the terminal apparatus 1 according to an aspect of the present embodiment. As illustrated in the figure, the terminal apparatus 1 includes a radio transmission and/or reception unit 10 and a higher layer processing unit 14. The radio transmission and/or reception unit 10 at least includes a part or all of an antenna unit 11, a Radio Frequency (RF) unit 12, and a baseband unit 13. The higher layer processing unit 14 at least includes a part or all of a medium access control layer processing unit 15 and a radio resource control layer processing unit 16. The radio transmission and/or reception unit 10 is also referred to as a transmitter, a receiver, or a physical layer processing unit.

The higher layer processing unit 14 outputs uplink data (transport block) generated by a user operation or the like to the radio transmission and/or reception unit 10. The higher layer processing unit 14 performs processing of an MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 performs management of various pieces of configuration information/parameters of its apparatus. The radio resource control layer processing unit 16 sets various pieces of configuration information/parameters, based on a higher layer signaling received from the base station apparatus 3. Specifically, the radio resource control layer processing unit 16 sets various pieces of configuration information/parameters, based on information indicating the various pieces of configuration information/parameters received from the base station apparatus 3. Note that the configuration information may include information related to the processing or configurations of the physical channel, the physical signal (that is, the physical layer), the MAC layer, the PDCP layer, the RLC layer, and the RRC layer. The parameters may be higher layer parameters.

The radio transmission and/or reception unit 10 performs processing of the physical layer, such as modulation, demodulation, coding, and decoding. The radio transmission and/or reception unit 10 separates, demodulates, and decodes a received physical signal, and outputs the decoded information to the higher layer processing unit 14. The radio transmission and/or reception unit 10 generates a physical signal by performing modulation and coding of data and generating a baseband signal (conversion into a time-continuous signal) and transmits the physical signal to the base station apparatus 3.

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 generates an OFDM symbol by performing Inverse Fast Fourier Transform (IFFT) on the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 amplifies power. The RF unit 12 may have a function of controlling transmission power. The RF unit 12 is also referred to as a transmission power control unit.

In the following, a configuration example of the base station apparatus 3 according to an aspect of the present embodiment will be described.

Figure 6:
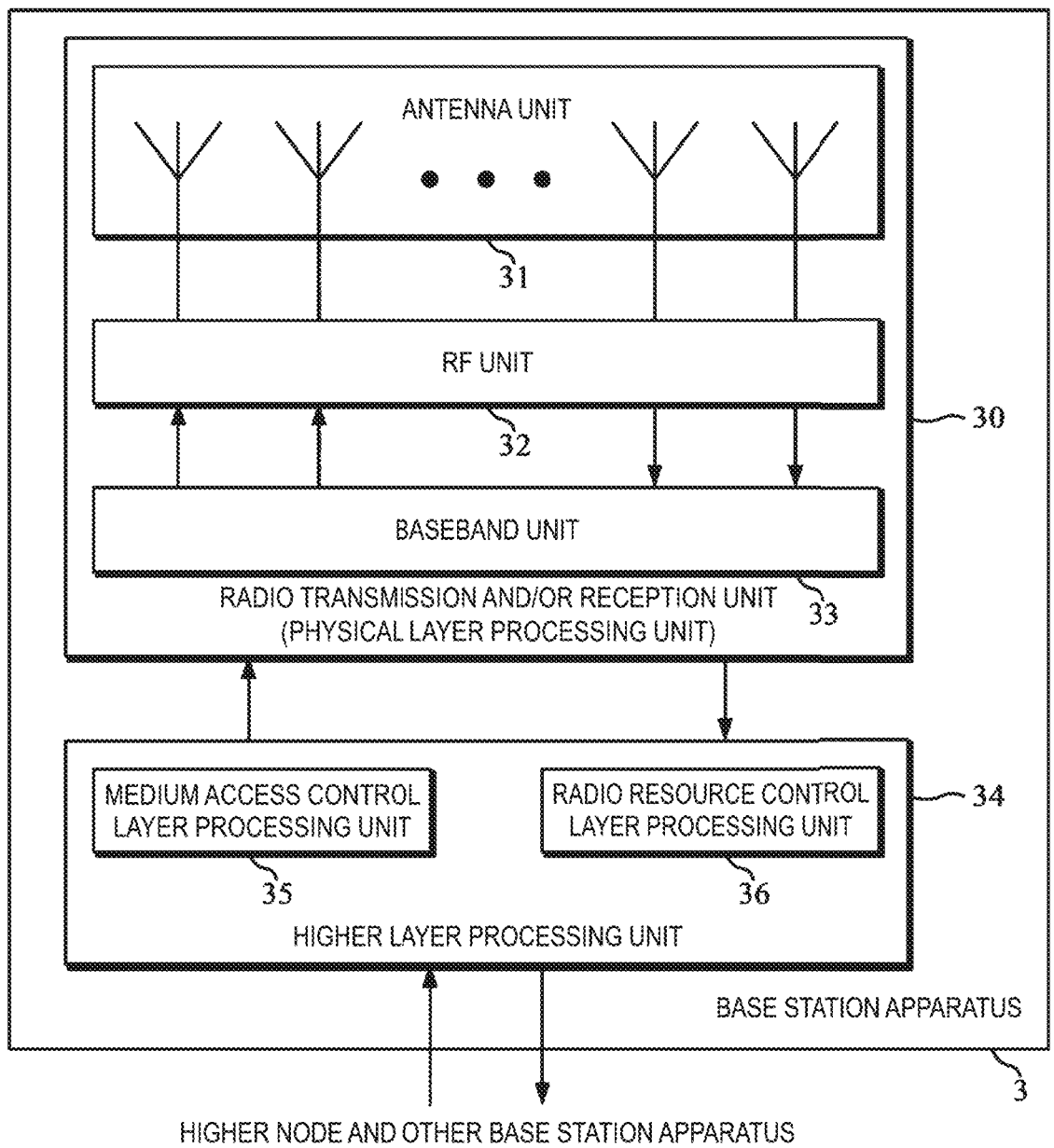
FIG. 6 is a schematic block diagram illustrating a configuration of a base station apparatus 3 according to an aspect of the present embodiment.

FIG. 6 is a schematic block diagram illustrating a configuration of the base station apparatus 3 according to an aspect of the present embodiment. As illustrated in the figure, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, or a physical layer processing unit.

The higher layer processing unit 34 performs processing of an MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) mapped to a PDSCH, system information, an RRC message, an MAC CE, and the like, and outputs the data to the radio transmission and/or reception unit 30. The radio resource control layer processing unit 36 performs management of various pieces of configuration information/parameters of each of the terminal apparatuses 1. The radio resource control layer processing unit 36 may set various pieces of configuration information/parameters for each of the terminal apparatuses 1 through a higher layer signaling. Specifically, the radio resource control layer processing unit 36 transmits or broadcasts information indicating the various pieces of configuration information/parameters. Note that the configuration information may include information related to the processing or configurations of the physical channel, the physical signal (that is, the physical layer), the MAC layer, the PDCP layer, the RLC layer, and the RRC layer. The parameters may be higher layer parameters.

The functionality of the radio transmission and/or reception unit 30 is similar to the functionality of the radio transmission and/or reception unit 10, and description thereof will thus be omitted.

Each of the units denoted by the reference sign 10 to the reference sign 16 included in the terminal apparatus 1 may be configured as a circuit. Each of the units denoted by the reference sign 30 to the reference sign 36 included in the base station apparatus 3 may be configured as a circuit.

The terminal apparatus 1 may perform Carrier sense prior to transmission of a physical signal. Also, the base station apparatus 3 may perform carrier sense prior to transmission of a physical signal. The carrier sense may be to perform Energy detection on a Radio channel. Whether the physical signal can be transmitted may be provided based on the carrier sense performed prior to transmission of the physical signal. In a case that the amount of energy detected in carrier sense performed prior to transmission of a physical signal is greater than a prescribed threshold value, for example, the transmission of the physical channel may not be performed, or it may be determined that the transmission is not possible. Also, in a case that the amount of energy detected in the carrier sense performed prior to the transmission of the physical signal is smaller than the prescribed threshold value, the transmission of the physical channel may be performed, or it may be determined that the transmission is possible. Moreover, in a case that the amount of energy detected in the carrier sense performed prior to the transmission of the physical signal is equal to the prescribed threshold value, the transmission of the physical channel may be performed or may not be performed. In other words, in a case that the amount of energy detected in the carrier sense performed prior to the transmission of the physical signal is equal to the prescribed threshold value, it may be determined that the transmission is not possible, or it may be determined that the transmission is possible.

A procedure in which whether the transmission of the physical channel is possible based on the carrier sense is also referred to as Listen Before Talk (LBT). A situation in which the transmission of the physical signal is determined to be not possible as a result of the LBT is also referred to as a busy state or busy. For example, the busy state may be a state in which the amount of energy detected in the carrier sense is greater than the prescribed threshold value. In addition, the situation in which the transmission of the physical signal is determined to be possible as a result of the LBT is also referred to as an idle state or idle. For example, the idle state may be a state in which the amount of energy detected in the carrier sense is smaller than the prescribed threshold value.

The terminal apparatus 1 may multiplex uplink control information (UCI) to the PUCCH and transmit the PUCCH. The terminal apparatus 1 may multiplex the UCI to the PUSCH and transmit the PUSCH. The UCI may include at least one of downlink Channel State Information (CSI), a Scheduling Request (SR) indicating a request for a PUSCH resource, and a Hybrid Automatic Repeat request ACKnowledgement (HARQ-ACK) for downlink data (a Transport block, a Medium Access Control Protocol Data Unit (MAC PDU), a Downlink-Shared Channel (DL-SCH), and/or a Physical Downlink Shared Channel (PDSCH)).

HARQ control for one transport block (TB) may be referred to as an HARQ process. The HARQ control is capable of parallel operation for multiple transport blocks (TBs). Each HARQ process may be associated with an HARQ process identifier.

Figure 7:
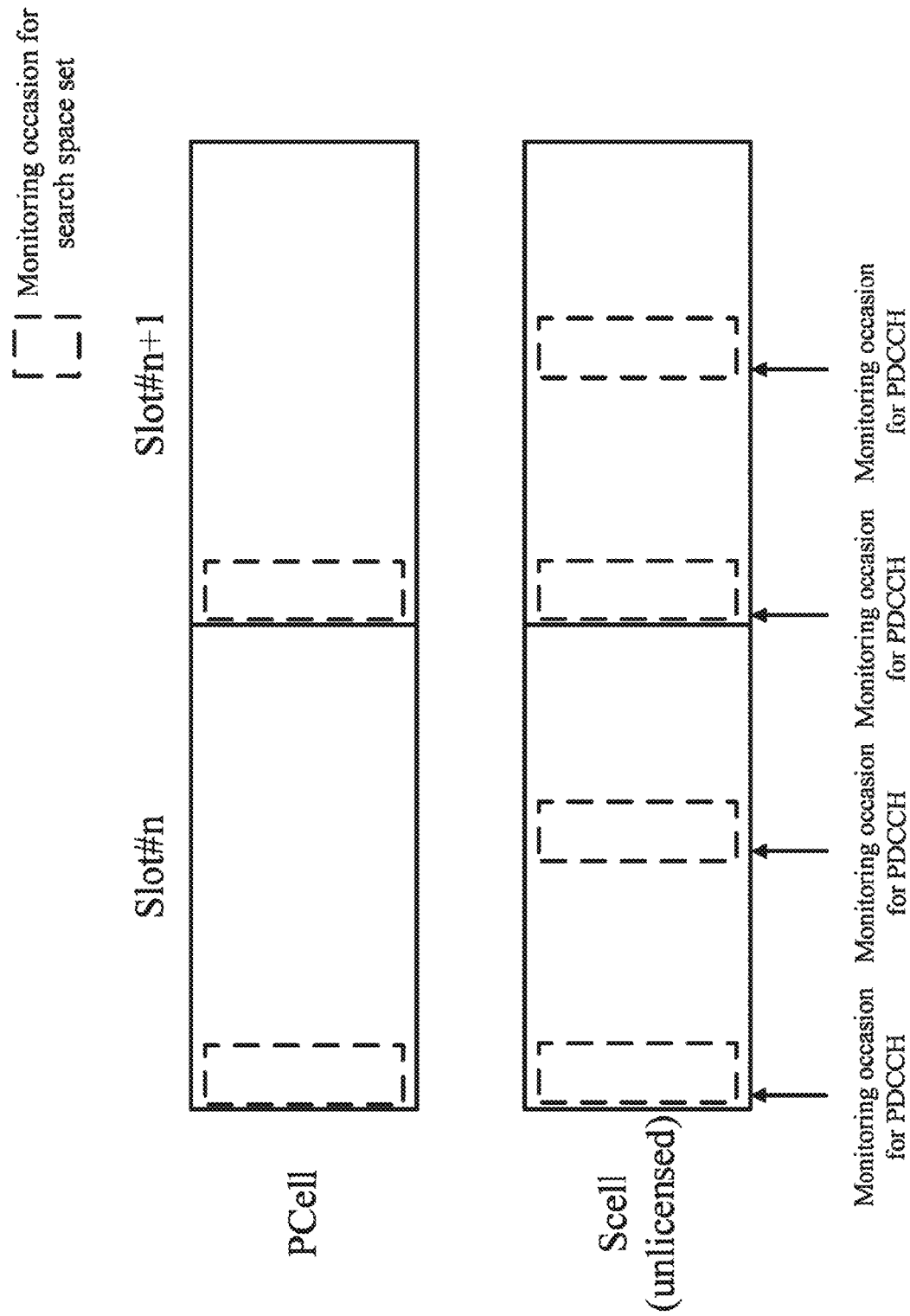
FIG. 7 is a diagram illustrating a correspondence example between the monitoring occasion for the search space set (Monitoring occasion for search space set) and the monitoring occasion for a PDCCH (Monitoring occasion for PDCCH) according to an aspect of the present embodiment.

FIG. 7 is a diagram illustrating a correspondence example between the monitoring occasion for the search space set (Monitoring occasion for search space set) and the monitoring occasion for the PDCCH (Monitoring occasion for PDCCH) according to an aspect of the present embodiment. In FIG. 7, the monitoring occasion for the search space set in the primary cell is the first OFDM symbol of the slot, and the monitoring occasion for the search space set in the secondary cell is the first OFDM symbol of the slot and the intermediate OFDM symbol (for example, OFDM symbol #7) of the slot. In FIG. 7, the monitoring occasion for the PDCCH corresponds to the first OFDM symbol of slot #n and the intermediate OFDM symbol of slot #n, and the first OFDM symbol of slot #n+1 and the intermediate OFDM symbol of slot #n+1. In other words, the monitoring occasion for the PDCCH may be defined as an occasion in which the monitoring occasion for the search space set is configured for at least one of one or multiple serving cells. The monitoring occasion for the PDCCH may correspond to an index of the OFDM symbol for which the monitoring occasion for the search space set is configured for at least one of one or multiple serving cells.

In the slot, the monitoring occasion for the search space set started from a certain OFDM symbol index may correspond to the monitoring occasion for the PDCCH started from the certain OFDM symbol index. The monitoring occasion for the PDCCH started from a certain OFDM symbol index may correspond to each monitoring occasion for the search space set started from the certain OFDM symbol index.

FIG. 8, FIG. 9, and FIG. 10 are diagrams illustrating an example of a procedure of configuration of a codebook (HARQ-ACK codebook) of the HARQ-ACK information according to an aspect of the present embodiment. <AX> of FIG. 8, FIG. 9, and FIG. 10 is also referred to as step AX. In FIG. 8, FIG. 9, and FIG. 10, "A=B" may mean that A is set to B. In FIG. 8, FIG. 9, and FIG. 10, "A=B" may mean that B is input to A. The terminal apparatus 1 generates the codebook (HARQ-ACK codebook) of the HARQ-ACK information, based on the procedure illustrated in FIG. 8, FIG. 9, and FIG. 10.

The codebook of the HARQ-ACK information may be given based at least on a part or all of step A1 to step A46.

The codebook of the HARQ-ACK information may be given based at least on a part or all of a set of monitoring occasions for the PDCCH, a value of a UL DAI field, a value of a counter DAI field, and/or a DAI field.

The codebook of the HARQ-ACK information may be given based at least on a part or all of a set of monitoring occasions for the PDCCH, a UL DAI, a counter DAI, and/or a total DAI.

In step A1, a serving cell index c is set to 0. The serving cell index may be given based at least on a higher layer parameter for each serving cell.

In step A2, m=0 is set. m may indicate an index of the monitoring occasion for the PDCCH including DCI format 1_0 or DCI format 1_1.

In step A3, j may be set to 0.

In step A4, $V_{temp}$ may be set to 0.

In step A5, $V_{temp2}$ may be set to 0.

In step A6, $V_s = \varphi$ may be set. $\varphi$ indicates an empty set.

In step A7, $N^{DL}_{cells}$ may be set to the number of serving cells. The number of serving cells may be the number of serving cells configured for the terminal apparatus 1.

In step A8, M may be set to the number of monitoring occasions for the PDCCH.

In step A9, the first evaluation expression m<M is evaluated. In a case that the first evaluation expression is true, step A10 may be performed. In a case that the first evaluation expression is false, step A34 may be performed.

In step A10, c may be set to 0.

In step A11, the second evaluation expression $c<N^{DL}_{cells}$ is evaluated. In a case that the second evaluation expression is true, step A11 may be performed. In a case that the second evaluation expression is false, step A33 may be performed.

In step A12, in a case that a monitoring occasion m for the PDCCH in a serving cell c is before switching of an activated downlink BWP, step A13 may be performed. In step A12, in a case that there is switching of an activated uplink BWP in the PCell, and switching of the activated downlink BWP is not triggered by DCI format 1_1, step A13 may be performed. In a case that neither of the two conditions described above is satisfied, step A14 may be performed.

In step A13, c may be set to c+1.

In step A14, step A15 may be performed.

In step A15, in a case that there is a PDSCH related to the PDCCH in the monitoring occasion m for the PDCCH in the serving cell c, or there is a PDCCH indicating release of the SPS PDSCH in the serving cell c, step A16 may be performed.

In step A16, the third evaluation expression $V^{DL}_{C\text{-}DAI,\ c,\ m} \leq V_{temp}$ is evaluated. In a case that the third evaluation expression is true, step A17 may be performed. In a case that the third evaluation expression is false, step A18 may be performed.

$V^{DL}_{C\text{-}DAI,\ c,\ m}$ is a value of a counter Downlink Assignment Index (DAI) given based at least on the PDCCH detected in the monitoring occasion m for the PDCCH in the serving cell c. The counter DAI indicates a cumulative number of the PDCCHs detected before the monitoring occasion m for the PDCCH in the serving cell c (or may be a value at least related to the cumulative number) in the M monitoring occasions for the PDCCH. In determination of the cumulative number, for the index of the PDCCH detected in the M monitoring occasions, the serving cell index c may be given first and the monitoring occasion m for the PDCCH may be given second. In other words, the index of the PDCCH detected in the M monitoring occasions for the PDCCH is first mapped in order of the serving cell index c, and may then be mapped in order of the monitoring occasion m for the PDCCH (serving cell index first, PDCCH monitoring occasion second mapping). The counter DAI may be referred to as a Counter Downlink Assignment Index (C-DAI).

In step A17, j may be set to j+1.

Step A18 may be a step indicating completion of operation based on the third evaluation expression in step A12.

In step A19, $V_{temp}$ may be set to $V^{DL}_{C\text{-}DAI,\ c,\ m}$.

In step A20, the fourth evaluation expression $V^{DL}_{T\text{-}DAI,\ m} = \varphi$ may be evaluated. In a case that the fourth evaluation expression is true, step A21 may be performed. In a case that the fourth evaluation expression is false, step A22 may be performed.

$V^{DL}_{T\text{-}DAI,\ m}$ may be a value of the total DAI given based at least on the PDCCH detected in the monitoring occasion m for the PDCCH in the serving cell c. The total DAI may indicate a cumulative number of the PDCCHs detected before the monitoring occasion m for the PDCCH (or may be a value at least related to the cumulative number) in the M monitoring occasions for the PDCCH. The total DAI may be referred to as a Total Downlink Assignment Index (T-DAI).

The codebook of the HARQ-ACK information may be multiplexed on the PUSCH scheduled based at least on DCI format 0_1, and $V^{DL}_{T\text{-}DAI,\ m}$ may be replaced by $V^{UL}_{DAI}$ at least in a case that m=M−1.

In step A21, $V_{temp2}$ may be set to $V^{DL}_{C\_DAI,\ c,\ m}$.

In step A22, step A23 may be performed.

In step A23, $V_{temp2}$ may be set to $V^{DL}_{T\text{-}DAI,\ m}$.

Step A24 may be a step indicating completion of operation based on the fourth evaluation expression in step A20.

In step A25, in a case that 1) harq-ACK-SpatialBundling-PUCCH is not provided, 2) the monitoring occasion m for the PDCCH is a monitoring occasion for the PDCCH including DCI format 1_0 or DCI format 1_1, 3) maxNrofCodeWordsScheduledByDCI is configured in at least one BWP in at least one serving cell for reception of two transport blocks, step A26 may be performed. maxNrofCodeWordsScheduledByDCI may be information indicating whether or not transmission of two transport blocks on PDSCH is supported.

In step A26, $o^{ACK}_a(8j+2\ (V^{DL}_{C\text{-}DAI,\ c,\ m}-1))$ may be set to a value of the HARQ-ACK bit corresponding to the first transport block of the serving cell c. In a case that the value of the HARQ-ACK bit is 1, this may indicate an ACK. In a case that the value of the HARQ-ACK bit is 0, this may indicate a NACK. The first transport block of the serving cell c may be the first transport block included in the PDSCH scheduled using a DCI format that is included in the PDCCH detected in the monitoring occasion m for the PDCCH in the serving cell c.

In step A27, $o^{ACK}_a(8j+2(V^{DL}_{C-DAI, c, m}-1)+1)$ may be set to a value of the HARQ-ACK bit corresponding to the second transport block of the serving cell c. The second transport block of the serving cell c may be the second transport block included in the PDSCH scheduled using a DCI format that is included in the PDCCH detected in the monitoring occasion m for the PDCCH in the serving cell c.

In a case that the PDSCH includes the first transport block, and the PDSCH does not include the second transport block, this may indicate that one transport block is included in the PDSCH.

In step A28, $V_s$ may be set to $V_s \cup \{8j+2(V^{DL}_{C-DAI, c, m}-1), 8j+2(V^{DL}_{C-DAI, c, m}-1)+1\}$. $Y \cup Z$ may indicate a union of set Y and set Z. {*} may be a set including *.

In step A29, in a case that 1) harq-ACK-SpatialBundling-PUCCH is provided, 2) the monitoring occasion m for the PDCCH is a monitoring occasion for the PDCCH including DCI format 1_1, and 3) maxNrofCodeWordsScheduledByDCI is configured in at least one BWP in at least one serving cell for reception of two transport blocks, step A30 may be performed.

In step A30, $o^{ACK}_a(4j+V^{DL}_{C-DAI, c, m}-1)$ may be set to a value given by a logical product (binary AND operation) of the first HARQ-ACK bit corresponding to the first transport block of the serving cell c and the second HARQ-ACK bit corresponding to the second transport block of the serving cell c.

In step A31, $V_s$ may be set to $V_s \cup \{4j+V^{DL}_{C-DAI, c, m}-1\}$.

In step A32, in a case that the condition of step A25 and the condition of step A29 are not satisfied, step A33 may be performed.

In step A33, $o^{ACK}_a(4j\ V^{DL}_{C-DAI, c, m} -1)$ may be set to a value of the first HARQ-ACK bit corresponding to the first transport block of the serving cell c. In step A33, $o^{ACK}_a(4j+V^{DL}_{C-DAI, c, m}-1)$ may be set to a value of the HARQ-ACK bit of the serving cell c.

In step A34, $V_s$ may be set to $V_s \cup \{4j+V^{DL}_{C-DAI, c, m}1\}$.

Step A35 may be a step indicating completion of operation of step A25.

Step A36 may be a step indicating completion of operation of step A15.

In step A37, c may be set to c+1.

Step A38 may be a step indicating completion of operation of step A12.

In step A39, step A11 may be performed.

In step A40, m may be set to m+1.

In step A41, step A10 may be performed.

In step A42, the fifth evaluation expression $V_{temp2}<V_{temp}$ may be performed. In a case that the fifth evaluation expression is true, step A43 may be performed. In a case that the fifth evaluation expression is false, step A44 may be performed.

In step A43, j may be set to j+1.

Step A44 may be a step indicating completion of step A42.

In step A45, in a case that 1) harq-ACK-SpatialBundling-PUCCH is not provided, and 2) maxNrofCodeWordsScheduledByDCI is configured in at least one BWP in at least one serving cell, step A46 may be performed. In a case that neither of the two conditions described above is satisfied, step A47 may be performed.

In step A46, $O_{ACK}$ may be set to 2 $(4j+V_{temp2})$.

In step A47, step A48 may be performed.

In step A48, $O_{ACK}$ may be set to $4j+V_{temp2}$.

Step A49 may be a step indicating completion of operation of step A12.

In step A50, $o^{ACK}_a(i_N)$ may be set to a value of a NACK for iN that satisfies $i_N \in \{0, 1, \ldots, O^{ACK}-1\} \setminus V_s$. $V \setminus W$ indicate a set obtained by eliminating elements included in set W from set V. $\setminus W$ may be a set difference of V regarding W.

In step A51, c may be set to 0.

In step A52, the seventh evaluation expression $c<N^{DL}_{cells}$ is evaluated. In a case that the seventh evaluation expression is true, step A54 may be performed. In a case that the second evaluation expression is false, step A58 may be performed.

In step A54, in a case that a PDSCH (SPS PDSCH) scheduled using a configured grant in one or multiple slots in the M monitoring occasions for the PDCCH is configured to be received, and transmission of the SPS PDSCH is activated, step AM may be performed.

In step A54, $O^{ACK}$ may be set to $O^{ACK}+1$. In step A44, $O^{ACK}$ may be set to $O^{ACK}+N_{SPS}$. $N_{SPS}$ may be the number of SPS PDSCHs configured to be received in M monitoring occasions 1001 for the PDCCH.

In step A55, $o^{ACK}_a(o^{ACK}_a-1)$ may be set to a value of the HARQ-ACK bit corresponding to the transport block included in the SPS PDSCH. In step A45, $o^{ACK}_a(o^{ACK}_a-i_{SPS})$ may be set to a value of the HARQ-ACK bit corresponding to the transport block included in the SPS PDSCH. $i_{SPS}$ may satisfy the condition of $i_{sps} \in \{0, 1, \ldots, N_{SPS}-1\}$. In step A45, $o^{ACK}_a(o^{ACK}_a-1)$ may be set to a value given by a logical product of the HARQ-ACK bits corresponding to the transport blocks included in each of one or multiple SPS PDSCHs configured to be received in M monitoring occasions for the PDCCH.

Step A56 may be a step indicating completion of operation of step A53.

In step A57, c may be set to c+1.

Step A58 may be a step indicating completion of operation of step A52.

The first evaluation expression to the seventh evaluation expression are each also referred to as an evaluation expression. In a case that an evaluation expression is true, this may indicate that the evaluation expression is satisfied. In a case that the evaluation expression is false, this may indicate that the evaluation expression is not true. In a case that the evaluation expression is false, this may indicate that the evaluation expression is not satisfied.

The terminal apparatus 1 may be associated with a PDSCH Group ID (PGI) regarding each PDSCH. The PGI of a certain PDSCH may be indicated based at least on a DCI format included in the PDCCH for scheduling the PDSCH. For example, a field indicating the PGI (PGI field) may be included in the DCI format. The PDSCH group may be a set of PDSCHs having the same PGI (PDSCH group ID). The PDSCH group may be one PDSCH, or a set of one or more PDSCHs associated with the same PGI.

For example, the PGI field may be included in DCI format 1_1. For example, the PGI field need not be included in DCI format 1_0. For example, the PGI field may be included in DCI format 1_0. For example, in a case that DCI format 1_0 not including the PGI field is detected, it may be considered that the PDSCH scheduled using DCI format 1_0 is included in a prescribed PDSCH group (for example, the PDSCH group having an index of 0 or 1). For example, in a case that the terminal apparatus 1 detects DCI format 1_0 not including the PGI field, it may be considered that the PDSCH scheduled using DCI format 1_0 is included in a prescribed PDSCH group (for example, the PDSCH group having an index of 0 or 1).

A Requested PDSCH Group (RPG) may be a PDSCH group corresponding to the HARQ-ACK feedback transmitted (reported) via the following PUCCH or PUSCH. The RPG (requested PDSCH group) may include one PDSCH group, or may include multiple PDSCH groups. Indication of the RPG may be indicated in association with each PDSCH group in a format of a bitmap, based at least on the DCI format. The terminal apparatus 1 may generate the HARQ-ACK codebook for the indicated RPG, and transmit (report) the HARQ-ACK codebook via the PUCCH or the PUSCH. The RPG may be indicated based at least on the RPG field included in the DCI format.

For example, the RPG field may be included in DCI format 1_1. For example, the RPG field need not be included in DCI format 1_0. For example, the RPG field may be included in DCI format 1_0. For example, in a case that DCI format 1_0 not including the RPG field is detected, it may be considered that transmission of the HARQ-ACK codebook for a prescribed PDSCH group (for example, the PDSCH group having an index of 0 or 1) is triggered in transmission of the HARQ-ACK codebook triggered using DCI format 1_0. For example, in a case that the terminal apparatus 1 detects DCI format 1_0 not including the RPG field, the terminal apparatus 1 may consider that transmission of the HARQ-ACK codebook for a prescribed PDSCH group (for example, the PDSCH group having an index of 0 or 1) is triggered in transmission of the HARQ-ACK codebook triggered using DCI format 1_0.

A value of K1 (information or a parameter indicated by the timing indication field from the PDSCH to the HARQ feedback) indicated by the DCI format included in the PDCCH may be a numerical value (numerical), or may be a non-numerical value (non-numerical). Here, the value of the numerical value may indicate a value expressed in numbers, and for example, may be a value out of {0, 1, 2, ..., 151}. The value of the non-numerical value indicates a value other than numbers. The use of the value of K1 being a numerical value and the value of K1 being a non-numerical value will be described below. For example, the PDSCH scheduled using the DCI format is transmitted in the base station apparatus 3 in slot n, and is received in the terminal apparatus 1. In a case that the value of K1 indicated by the DCI format is a numerical value, the terminal apparatus 1 may transmit (report) the HARQ-ACK information corresponding to the PDSCH in slot n+K1 via the PUCCH or the PUSCH. In a case that the value of K1 indicated by the DCI format is a non-numerical value, the terminal apparatus 1 may defer reporting of the HARQ-ACK information corresponding to the PDSCH. In a case that the value of K1 being a non-numerical value is indicated by the DCI format including scheduling information of the PDSCH, the terminal apparatus 1 may defer reporting of the HARQ-ACK information corresponding to the PDSCH. For example, the terminal apparatus 1 may store the HARQ-ACK information, and transmit (report) the HARQ-ACK information with the transmission of the HARQ-ACK information being triggered based at least on a DCI format other than the DCI format described above, without transmitting (reporting) the HARQ-ACK information via the following PUCCH or PUSCH.

A New Feedback Indicator (NFI) field may be a DCI field indicating whether or not the HARQ-ACK information of the PDSCH is correctly detected. The NFI field may be included in DCI format 0_1. The NFI field may be included in DCI format 1_0. The NFI field need not be included in DCI format 1_0. The NFI field may be 1 bit, or may be 1 bit or more. Each bit of the NFI field may correspond to each PDSCH group. For example, in a case that the number of PDSCH groups is two, the NFI field of 2 bits may be set with (X, Y), and NFI bit X may correspond to PDSCH group #1, and NFI bit Y may correspond to PDSCH group #2. For example, in a case that the number of PDSCH groups is 4, the NFI field of 4 bits may be set with (X, Y, Z, W), and NFI bit X may correspond to PDSCH group #1, NFI bit Y may correspond to PDSCH group #2, NFI bit Z may correspond to PDSCH group #3, and NFI bit W may correspond to PDSCH group #4.

For example, in a case that DCI format 1_0 not including the NFI field is detected, it may be considered that the NFI is toggled for the PDSCH group including the PDSCH scheduled using the DCI format. For example, in a case that DCI format 1_0 not including the NFI field is detected, it may be considered that the NFI is not toggled for the PDSCH group including the PDSCH scheduled using the DCI format. For example, in a case that the terminal apparatus 1 detects DCI format 1_0 not including the NFI field, the terminal apparatus 1 may consider that the NFI is toggled for the PDSCH group including the PDSCH scheduled using the DCI format. For example, in a case that the terminal apparatus 1 detects DCI format 1_0 not including the NFI field, the terminal apparatus 1 may consider that the NFI is not toggled for the PDSCH group including the PDSCH scheduled using the DCI format.

After transmitting the first PUCCH or the first PUSCH, the terminal apparatus 1 may store a value of the NFI bit corresponding to each PDSCH group indicated by the PDCCH (or the DCI format) for scheduling the first PUCCH or the first PUSCH. In a case that the terminal apparatus 1 receives the PDCCH (or the DCI format) for scheduling the first PUCCH or the first PUSCH, the terminal apparatus 1 may store a value of the NFI bit corresponding to each PDSCH group indicated by the PDCCH (or the DCI format). For each PDSCH group, the initial value of the stored value of the NFI bit may be set to 0 in advance. In a case that the terminal apparatus 1 transmits the second PUCCH or the second PUSCH subsequently to the first PUCCH or the first PUSCH, the terminal apparatus 1 may compare a value of the NFI bit corresponding to the PDSCH group indicated by the PDCCH for scheduling the second PUCCH or the second PUSCH and the above-described stored value of the NFI bit for a certain PDSCH group. In other words, the terminal apparatus 1 may compare a value of the received NFI bit and the value of the stored NFI bit and thereby determine whether or not the NFI bit corresponding to the PDSCH group is toggled. In a case that the two values of the NFI bits are different, the terminal apparatus 1 may determine that the NFI bit is toggled, and the HARQ-ACK information corresponding to the PDSCH group described above is correctly detected. The terminal apparatus 1 may determine that the HARQ-ACK information corresponding to the PDSCH group for which the NFI bit is toggled is detected in the base station apparatus 3. In a case that the base station apparatus 3 detects the HARQ-ACK information corresponding to the PDSCH group, the base station apparatus 3 may toggle the NFI bit corresponding to the PDSCH group. In a case that the two values of the NFI bits are the same, it may be determined that the NFI bit is not toggled, and the HARQ-ACK information corresponding to the PDSCH group described above is not correctly detected. The terminal apparatus 1 may determine that the HARQ-ACK information corresponding to the PDSCH group for which the NFI bit is not toggled is not detected in the base station apparatus 3. In a case that the base station apparatus 3 does not detect the HARQ-ACK information corresponding to the PDSCH group, the base station apparatus 3 need not toggle the NFI bit corresponding to the PDSCH group. Here, "to toggle" means to switch to a different value.

In a case that the terminal apparatus 1 generates the HARQ-ACK codebook corresponding to a certain PDSCH group, and the NFI bit corresponding to the PDSCH group is toggled, the terminal apparatus 1 may delete (need not include) the HARQ-ACK information already reported (HARQ-ACK information other than HARQ-ACK information not reported yet) from the HARQ-ACK codebook corresponding to the PDSCH group. In a case that there is a PDSCH that is detected and for which the HARQ-ACK information is not reported yet out of the PDSCH group, the terminal apparatus 1 need not delete (may include) the HARQ-ACK information corresponding to the PDSCH. In other words, the terminal apparatus 1 may multiplex the HARQ-ACK information corresponding to the PDSCH on the HARQ-ACK codebook described above. For one or more pieces of HARQ-ACK information corresponding to the PDSCH group for which the NFI bit is toggled, the terminal apparatus 1 may flush the HARQ-ACK information that is already reported, and need not flush the HARQ-ACK information that is not reported. Here, "to flush" means to bring the HARQ-ACK information to the initial value (for example, a NACK). In a case that the terminal apparatus 1 receives the NFI being toggled and then transmits the HARQ-ACK codebook corresponding to the PDSCH group for the NFI bit, the terminal apparatus 1 generates the HARQ-ACK codebook by using the HARQ-ACK information not being flushed (HARQ-ACK information not being reported) and transmits the HARQ-ACK codebook. In a case that the terminal apparatus 1 receives the NFI not being toggled and then transmits the HARQ-ACK codebook corresponding to the PDSCH group for the NFI bit, the terminal apparatus 1 generates the HARQ-ACK codebook by using the HARQ-ACK information not being flushed (HARQ-ACK information being reported and HARQ-ACK information not being reported) and transmits the HARQ-ACK codebook.

Figure 11:
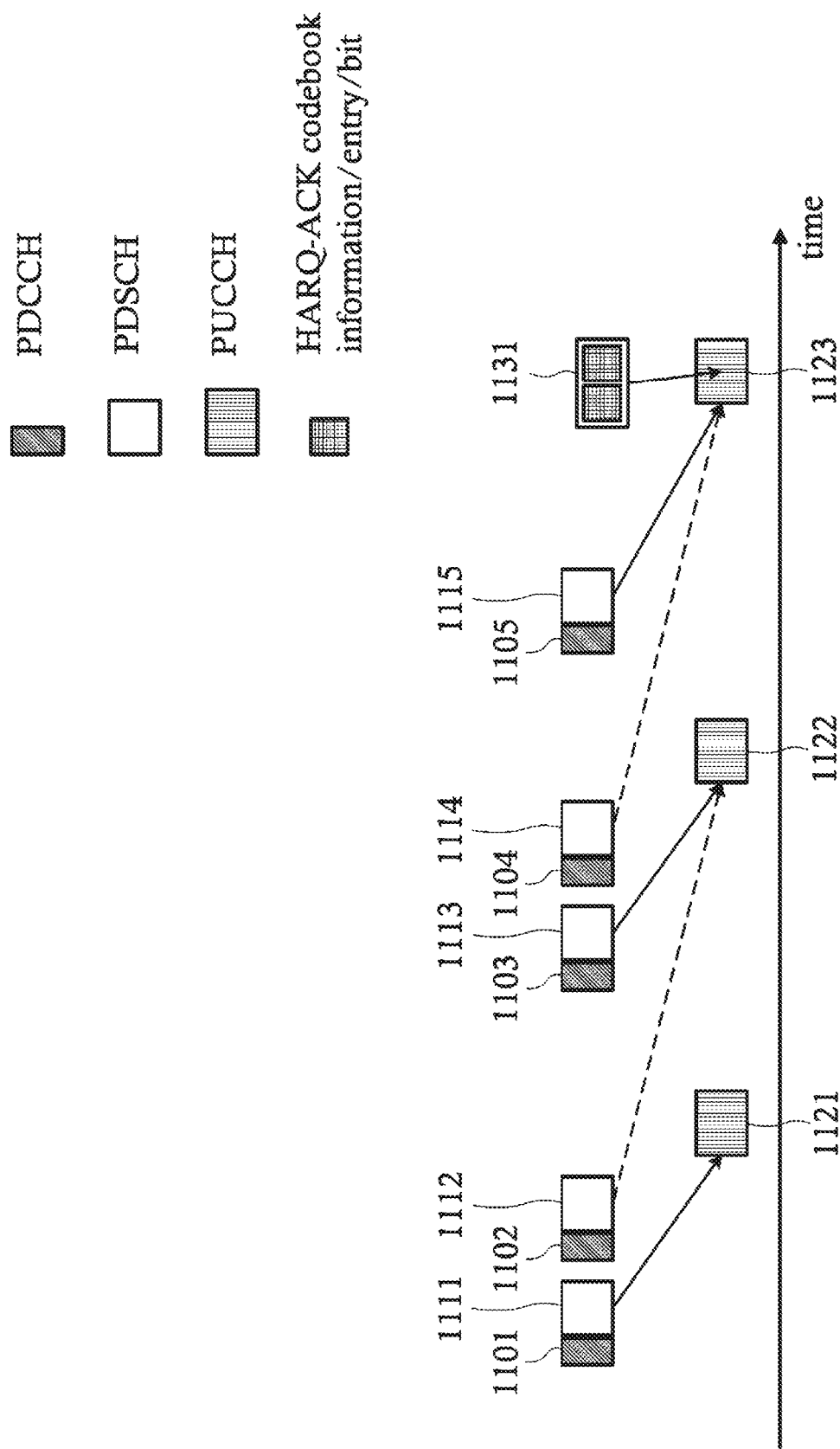
FIG. 11 is a diagram illustrating an example of reporting of HARQ-ACK information according to an aspect of the present embodiment.

FIG. 11 is a diagram illustrating an example of reporting of the HARQ-ACK information according to an aspect of the present embodiment.

With a DCI format of a PDCCH 1101 for scheduling a PDSCH 1111, G1 is indicated as a PDSCH group ID (PGI), and a numerical value is indicated by a K1. With a DCI format of a PDCCH 1102 for scheduling a PDSCH 1112, G2 is indicated as the PGI, a first value is indicated as the NFI corresponding to the PDSCH group G2, and a non-numerical value is indicated as K1. With a DCI format of a PDCCH 1103 for scheduling a PDSCH 1113, G1 is indicated as the PGI, and a numerical value is indicated as K1. With a DCI format of a PDCCH 1104 for scheduling a PDSCH 1114, G2 is indicated as the PGI, a second value is indicated as the NFI corresponding to the PDSCH group G2, and a non-numerical value indicated as K1. With a DCI format of a PDCCH 1105 for scheduling a PDSCH 1115, a third value is indicated as the NFI corresponding to the PDSCH group G2. A HARQ-ACK codebook 1131 is transmitted (reported) via a PUCCH 1123. The HARQ-ACK codebook 1131 corresponds to the PDSCH group G1 and/or the PDSCH group G2. The HARQ-ACK codebook 1131 may correspond to the requested PDSCH group (RPG) indicated based at least on the DCI format of the PDCCH 1105.

In FIG. 11, the terminal apparatus 1 may multiplex the HARQ-ACK information corresponding to the PDSCH 1112 on the HARQ-ACK codebook transmitted via a PUCCH 1122, regardless of whether or not the first value and the second value are different (in other words, whether or not the NFI is toggled) (whether or not the NFI corresponding to the PDSCH group G2 is toggled). The terminal apparatus 1 may multiplex the HARQ-ACK information corresponding to the PDSCH 1114 on the HARQ-ACK codebook 1131 transmitted via the PUCCH 1123, regardless of whether or not the second value and the third value are different (whether or not the NFI corresponding to the PDSCH group G2 is toggled). In a case that the second value and the third value are the same (in other words, not toggled) (NFI corresponding to the PDSCH group G2 is not toggled), the terminal apparatus 1 may multiplex the HARQ-ACK information corresponding to the PDSCH 1112 on the HARQ-ACK codebook 1131, and retransmits the HARQ-ACK information of the PDSCH 1112. In a case that the second value and the third value are different (in other words, toggled) (NFI corresponding to the PDSCH group G2 is toggled), the terminal apparatus 1 need not retransmit the HARQ-ACK information of the PDSCH 1112.

FIG. 12 is an example illustrating a toggle state of the NFI bit according to an aspect of the present embodiment.

A received NFI may be an NFI indicated by the PDCCH (or, the DCI format) for scheduling the PDSCH. A stored NFI may be an NFI already stored in the terminal apparatus 1 before the PDCCH for scheduling the PDSCH is detected. Each entry of the stored NFI may be a stored NFI bit corresponding to each of the PDSCH groups (for example, the PDSCH group G1 and the PDSCH group G2). For example, in a case that the stored NFI is (0, 1), the value of the stored NFI bit of the PDSCH group G1 is 0, and the value of the stored NFI bit of the PDSCH group G2 is 1. In the table of FIG. 12, for the PDSCH group G2, the concept of the stored NFI bit and the received NFI bit will be described using the specific example of FIG. 11. At the time point that the terminal apparatus 1 detects the PDCCH 1101, the value of the stored NFI bit is the initial value, and the received NFI bit is not indicated by the PDCCH 1101. After the PDCCH 1101 is detected, the value of the stored NFI bit need not be updated. At the time point that the terminal apparatus 1 detects the PDCCH 1102, the value of the stored NFI bit is the initial value, and the value of the received NFI bit is the first value indicated by the PDCCH 1102. After the PDCCH 1102 is detected, the value of the stored NFI bit may be updated to the first value. At the time point that the terminal apparatus 1 detects the PDCCH 1103, the value of the stored NFI bit is the first value, and the received NFI bit is not indicated by the PDCCH 1103. After the PDCCH 1103 is detected, the value of the stored NFI bit need not be updated. At the time point that the terminal apparatus 1 detects the PDCCH 1104, the value of the stored NFI bit is the first value, and the value of the received NFI bit is the second value indicated by the PDCCH 1104. After the PDCCH 1104 is detected, the value of the stored NFI bit may be updated to the second value. At the time point that the terminal apparatus 1 detects the PDCCH 1105, the value of the stored NFI bit is the second value, and the value of the received NFI bit is the third value indicated by the PDCCH 1105. In other words, in a certain case, in a case that the PGI indicated by the DCI format for scheduling the PDSCH is G1, the terminal apparatus 1 need not update the received NFI corresponding to the PDSCH group G2. In a certain case, in a case that the PGI indicated by the DCI format for scheduling the PDSCH is G1, the terminal apparatus 1 need not update the stored NFI corresponding to the PDSCH group G2. In a certain case, in a case that the PGI indicated by the DCI format for scheduling the PDSCH is G1, the terminal apparatus 1 need not update the received NFI corresponding to the PDSCH group G2; however, the terminal apparatus 1 may update the stored NFI for the PDSCH group G2.

The terminal apparatus 1 may process the HARQ-ACK information, depending on a report state of the HARQ-ACK information corresponding to the PDSCH, and whether or not the NFI bit of the PDSCH group to which the PDSCH belongs is toggled. In a case that, for a certain PDSCH, the report state of the HARQ-ACK information corresponding to the PDSCH is already reported, and the NFI bit corresponding to the PDSCH group to which the PDSCH belongs is toggled, the terminal apparatus 1 may determine that the HARQ-ACK information corresponding to the PDSCH is correctly detected. In other words, in a case that the NFI bit corresponding to the PDSCH group to which the PDSCH belongs is toggled, the terminal apparatus 1 need not perform retransmission of the HARQ-ACK information. In a case that the terminal apparatus 1 toggles the NFI bit corresponding to the PDSCH group to which the PDSCH belongs, the HARQ-ACK information may be deleted. In other words, in a case that the terminal apparatus 1 generates the HARQ-ACK codebook after determining deletion of the HARQ-ACK information, the terminal apparatus 1 need not take the HARQ-ACK information into consideration. The HARQ-ACK information corresponding to a certain PDSCH may be referred to as an HARQ-ACK entry of the PDSCH in the HARQ-ACK codebook. The HARQ-ACK entry may include one HARQ-ACK bit, or may include multiple HARQ-ACK bits.

In a case that, for a certain PDSCH, the report state of the HARQ-ACK information corresponding to the PDSCH is not-reported, and the NFI bit corresponding to the PDSCH group to which the PDSCH belongs is toggled, the terminal apparatus 1 need not determine that the HARQ-ACK information corresponding to the PDSCH is correctly detected. In other words, in a case that the NFI bit corresponding to the PDSCH group to which the PDSCH belongs is toggled, the terminal apparatus 1 may perform transmission of the HARQ-ACK information. In a case that the NFI bit corresponding to the PDSCH group to which the PDSCH belongs is toggled, the terminal apparatus 1 need not delete the HARQ-ACK information. In other words, in a case that the terminal apparatus 1 generates the HARQ-ACK codebook, the terminal apparatus 1 may take the HARQ-ACK information into consideration.

In FIG. 11, in a case that the NFI bit corresponding to the PDSCH group G2 is not toggled in a case that the terminal apparatus 1 generates the HARQ-ACK codebook (for example, the HARQ-ACK codebook 1131) transmitted on the PUCCH (for example, the PUCCH 1123), the terminal apparatus 1 may generate the HARQ-ACK codebook 1131 so as to include both of the HARQ-ACK information corresponding to the PDSCH that is already reported (for example, the HARQ-ACK information corresponding to the PDSCH 1112) and the HARQ-ACK information corresponding to the PDSCH that is not reported yet (for example, the HARQ-ACK information corresponding to the PDSCH 1114). Here, the HARQ-ACK information corresponding to the PDSCH not reported may include the HARQ-ACK information corresponding to the PDSCH scheduled by the PDCCH with the HARQ-ACK feedback timing indicating the value of K1 being a slot of its PUCCH (for example, HARQ-ACK information corresponding to the PDSCH 1115). Alternatively, the HARQ-ACK information corresponding to the PDSCH not reported need not include the HARQ-ACK information corresponding to the PDSCH scheduled by the PDCCH including its NFI (for example, HARQ-ACK information corresponding to the PDSCH 1115). In this case, in a case that the NFI bit corresponding to the PDSCH group G2 is not toggled, the HARQ-ACK codebook 1131 may be generated so as to include all of the HARQ-ACK information corresponding to the PDSCH that is already reported (for example, HARQ-ACK information corresponding to the PDSCH 1112), the HARQ-ACK information corresponding to the PDSCH that is not reported yet (for example, HARQ-ACK information corresponding to the PDSCH 1114), and the HARQ-ACK information corresponding to the PDSCH scheduled by the PDCCH with the HARQ-ACK feedback timing indicating the value of K1 being a slot of its PUCCH (for example, HARQ-ACK information corresponding to the PDSCH 1115). In FIG. 11, in a case that the NFI bit corresponding to the PDSCH group G2 is toggled in a case that the terminal apparatus 1 generates the HARQ-ACK codebook 1131, the terminal apparatus 1 may delete (need not include) the HARQ-ACK information corresponding to the PDSCH 1112. In other words, the terminal apparatus 1 need not multiplex the HARQ-ACK information corresponding to the PDSCH 1112 on the HARQ-ACK codebook 1131. The terminal apparatus 1 may multiplex the HARQ-ACK information corresponding to the PDSCH 1114 on the HARQ-ACK codebook 1131. Here, whether or not the NFI bit is toggled may be determined based at least on comparison between the value of the NFI bit indicated by the PDCCH 1105 and the value of the NFI bit indicated by the PDCCH 1103. In a case that the two values are different, the terminal apparatus 1 may determine that the NFI bit is toggled, and in a case that the two values are the same, the terminal apparatus 1 may determine that the NFI bit is not toggled. Note that, to multiplex the HARQ-ACK information on the HARQ-ACK codebook may mean that the HARQ-ACK codebook includes the HARQ-ACK information in a case of generating the HARQ-ACK codebook. Alternatively, it may mean that the HARQ-ACK information and the HARQ-ACK codebook are multiplexed on the same signal or channel FIG. 13 is an example of reporting of the HARQ-ACK information in a case that the NFI bit corresponding to a certain PDSCH group is toggled according to an aspect of the present embodiment.

In FIG. 11 and FIG. 13, with the example of generation of the HARQ-ACK codebook 1131, relation to the HARQ-ACK feedback will be described. The HARQ-ACK feedback refers to a process that the terminal apparatus 1 transmits, to the base station apparatus 3, the HARQ-ACK corresponding to the transport block included in the received PDSCH.

In FIG. 13, based on the table of FIG. 12, indication from the base station apparatus 3 and processing in the terminal apparatus 1 related to generation of the HARQ-ACK codebook will be described. The base station apparatus 3 indicates G1 as the PGI, G1 as the RPG, 1 as the C-DAI, and (0, 0) as the NFI via the PDCCH 1101. In a case that the NFI is not indicated (received) before the PDSCH 1111 is detected, the terminal apparatus 1 keeps the stored NFI at the initial value of (0, 0). The terminal apparatus 1 detects the PDCCH 1101, and recognizes that the PGI of the PDSCH 1111 scheduled by the PDCCH 1101 is G1, the RPG is G1, the C-DAI is 1, and the received NFI is (0, 0). By comparing the received NFI bit for the PDSCH group G1 and the stored NFI bit for the PDSCH group G1, the terminal apparatus 1 may determine that the NFI bit of the PDSCH group G1 is not toggled. By comparing the received NFI for the PDSCH group G2 and the stored NFI for the PDSCH group G2, the terminal apparatus 1 may determine that the NFI bit of the PDSCH group G2 is not toggled. The terminal apparatus 1 may set the report state of the HARQ-ACK information corresponding to the PDSCH 1111 to not-reported. Here, in the terminal apparatus 1, in a case that the HARQ-ACK information corresponding to the PDSCH is not already reported, the report state may be set to already reported, and in a case that the above-described HARQ-ACK information is not reported, the report state may be set to not-reported. In the terminal apparatus 1, in a case that transmission of the HARQ-ACK information corresponding to the PDSCH in a certain uplink physical channel is already triggered, and transmission of the resource of the uplink physical channel is attempted, the report state may be set to already reported, and in a case that transmission of the above-described HARQ-ACK information in a certain uplink physical channel is already triggered, and transmission of the resource of the uplink physical channel is not attempted, the report state may be set to not-reported. In transmission of the HARQ-ACK information corresponding to the PDSCH in a certain uplink physical channel is not triggered in the terminal apparatus 1, the report state may be set to not-reported or N/A. The initial value of the report state may be set to N/A in advance.

In FIG. 13, the terminal apparatus 1 detects the PDCCH 1102, and recognizes that the PGI of the PDSCH 1112 scheduled by the PDCCH 1102 is G2, the C-DAI is 1, and the received NFI is (0, 0). The terminal apparatus 1 may ignore the RPG indicated by the PDCCH (for example, the PDCCH 1102 and the PDCCH 1104) having K1 being a non-numerical value. In other words, the requested PDSCH group may be determined based at least on the PDCCH (for example, the PDCCH having K1 being a numerical value) other than the PDCCH having K1 being a non-numerical value. For example, the requested PDSCH group corresponding to the HARQ-ACK codebook including the HARQ-ACK information transmitted on a certain PUCCH may be indicated by the RPG field included in the DCI format used for determination of the resource of the certain PUCCH. By updating the stored NFI to the NFI (specifically, (0, 0)) indicated by the PDCCH 1101 and comparing the received NFI (specifically, (0, 0)) and the stored NFI (specifically, (0, 0)), the terminal apparatus 1 may determine that the NFI bit corresponding to each of the PDSCH group G1 and the PDSCH group G2 is not toggled. The terminal apparatus 1 may set the report state of the HARQ-ACK information corresponding to the PDSCH 1112 to not-reported. The terminal apparatus 1 may include the HARQ-ACK information corresponding to the PDSCH (for example, the PDSCH 1111) at least satisfying a part or all of condition A1 to condition A4 in the HARQ-ACK codebook, and transmit (report) the HARQ-ACK information via a PUCCH 1121.

Condition A1: The PGI is included in the requested PDSCH group

Condition A2: The report state of the HARQ-ACK information is not-reported

Condition A3: The HARQ-ACK information whose associated value of K1 is a numerical value or associated value of K1 is a non-numerical value is deferred Condition A4: Regarding the PDSCH group including the PDSCH corresponding to the HARQ-ACK information, the NFI is toggled For example, a state in which the report state of the HARQ-ACK information is not-reported may be a state that transmission of the HARQ-ACK information is not triggered. For example, a state in which the report state of the HARQ-ACK information is not-reported may be a state in which new transmission of the HARQ-ACK information is not triggered. For example, a state in which the report state of the HARQ-ACK information is not-reported may be a state in which transmission of the HARQ-ACK information has been triggered. For example, a state in which the report state of the HARQ-ACK information is not-reported may be a state in which new transmission of the HARQ-ACK information is already triggered. For example, a state in which the report state of the HARQ-ACK information is not-reported may be a state in which the report state of the HARQ-ACK information is already reported.

In FIG. 13, at the time point that the HARQ-ACK codebook transmitted (reported) via the PUCCH 1122 is generated, the HARQ-ACK information corresponding to the PDSCH 1112 having K1 being a non-numerical value has already been deferred (has been postponed), and the HARQ-ACK information corresponding to the PDSCH 1114 having K1 being a non-numerical value is to be deferred (to be postponed). In a case that the terminal apparatus 1 generates the above-described HARQ-ACK codebook, the terminal apparatus 1 need not multiplex the HARQ-ACK information to be deferred (for example, the HARQ-ACK information corresponding to the PDSCH 114) on the HARQ-ACK codebook.

In FIG. 13, it is assumed that the base station apparatus 3 correctly detects the HARQ-ACK codebook transmitted (reported) via the PUCCH 1121. The terminal apparatus 1 detects the PDCCH 1103, and recognizes that the PGI of the PDSCH 1113 scheduled by the PDCCH 1103 is G1, the RPG is G1 and G2, the C-DAI is 1, and the received NFI is (1, 0). The terminal apparatus 1 updates the stored NFI to the NFI (specifically, (0, 0)) indicated by the PDCCH 1102. By comparing the received NFI bit for the PDSCH group G1 and the stored NFI bit for the PDSCH group G1, the terminal apparatus 1 may determine that the NFI bit of the PDSCH group G1 is toggled. By comparing the received NFI bit for the PDSCH group G2 and stored NFI bit for the PDSCH group G2, the terminal apparatus 1 may determine that the NFI bit of the PDSCH group G2 is not toggled. The terminal apparatus 1 may update the report state of the HARQ-ACK information corresponding to the PDSCH 1111 to already reported (reported), or may set the report state of the HARQ-ACK information corresponding to the PDSCH 1113 to not-reported.

The terminal apparatus 1 detects the PDCCH 1104, and recognizes that the PGI of the PDSCH 1114 scheduled by the PDCCH 1104 is G2, the C-DAI is 2, and the received NFI is (1, 0). The terminal apparatus 1 updates the stored NFI to the NFI (specifically, (1, 0)) indicated by the PDCCH 1103. By comparing the received NFI bit for the PDSCH group G1 and the stored NFI bit for the PDSCH group G1, the terminal apparatus 1 may determine that the NFI bit of the PDSCH group G1 is not toggled. By comparing the received NFI bit for the PDSCH group G2 and stored NFI bit for the PDSCH group G2, the terminal apparatus 1 may determine that the NFI bit of the PDSCH group G2 is not toggled. The terminal apparatus 1 may reset the report state of the HARQ-ACK information corresponding to the PDSCH 1111 to the initial value (for example, N/A), or may set the report state of the HARQ-ACK information corresponding to the PDSCH 1114 to not-reported. Here, the terminal apparatus 1 may flush the HARQ-ACK information, based at least on a fact that the NFI bit corresponding to the PDSCH group G1 is toggled, and the report state of the HARQ-ACK information corresponding to the PDSCH 1111 is already reported. The terminal apparatus 1 need not flush the HARQ-ACK information based at least on a fact that the NFI bit corresponding to the PDSCH group G2 is not toggled, and/or the report state of the HARQ-ACK information corresponding to the PDSCH 1112 is not-reported. The terminal apparatus 1 may multiplex the HARQ-ACK information corresponding to the PDSCH (in other words, the PDSCH 1112 and the PDSCH 1113) at least satisfying a part or all of condition A1 to condition A4 on the HARQ-ACK codebook, and transmit (report) the HARQ-ACK information via the PUCCH 1122.

In FIG. 13, it is assumed that the base station apparatus 3 correctly detects the HARQ-ACK codebook transmitted (reported) via the PUCCH 1122. The terminal apparatus 1 detects the PDCCH 1105, and recognizes that the PGI of the PDSCH 1115 scheduled by the PDCCH 1105 is G1, the RPG is G1 and G2, the C-DAI is 1, and the received NFI is (0, 1). The terminal apparatus 1 updates the stored NFI to the NFI (specifically, (1, 0)) indicated by the PDCCH 1104. By comparing the received NFI bit for the PDSCH group G1 and the stored NFI bit for the PDSCH group G1, the terminal apparatus 1 may determine that the NFI bit of the PDSCH group G1 is toggled. By comparing the received NFI bit for the PDSCH group G2 and stored NFI bit for the PDSCH group G2, the terminal apparatus 1 may determine that the NFI bit of the PDSCH group G2 is toggled. Here, the terminal apparatus 1 may flush the HARQ-ACK information, based at least on a fact that the NFI bit corresponding to the PDSCH group G1 is toggled, and the report state of the HARQ-ACK information corresponding to the PDSCH 1113 is already reported. The terminal apparatus 1 may flush the HARQ-ACK information, based at least on a fact that the NFI bit corresponding to the PDSCH group G2 is toggled, and the report state of the HARQ-ACK information corresponding to the PDSCH 1112 is already reported. The terminal apparatus 1 need not flush the HARQ-ACK information, based at least on a fact that the NFI bit corresponding to the PDSCH group G2 is toggled, and/or the report state of the HARQ-ACK information corresponding to the PDSCH 1114 is not-reported. The terminal apparatus 1 may update the report state of the HARQ-ACK information corresponding to the PDSCH 1112 to already reported, may update the report state of the HARQ-ACK information corresponding to the PDSCH 1113 to already reported, and may set the report state of the HARQ-ACK information corresponding to the PDSCH 1115 to not-reported. The terminal apparatus 1 may multiplex the HARQ-ACK information corresponding to the PDSCH (for example, the PDSCH 1114 and the PDSCH 1115) at least satisfying a part or all of condition A1 to condition A4 on the HARQ-ACK codebook 1131, and transmit (report) the HARQ-ACK information via the PUCCH 1123.

FIG. 14 is an example of reporting of the HARQ-ACK information in a case that the NFI bit corresponding to a certain PDSCH group is not toggled according to an aspect of the present embodiment.

In FIG. 14, the base station apparatus 3 assumes that the base station apparatus 3 does not detect the PUCCH 1122. In other words, a scenario in which the terminal apparatus 1 retransmits the HARQ-ACK information included in the PUCCH 1122 is assumed. The terminal apparatus 1 detects the PDCCH 1105, and recognizes that the PGI of the PDSCH 1115 scheduled by the PDCCH 1105 is G1, the RPG is G1 and G2, the C-DAI is 2, and the received NFI is (1, 0). The terminal apparatus 1 updates the stored NFI to the NFI (specifically, (1, 0)) indicated by the PDCCH 1104. By comparing the received NFI bit for the PDSCH group G1 and the stored NFI bit for the PDSCH group G1, the terminal apparatus 1 may determine that the NFI bit of the PDSCH group G1 is not toggled. By comparing the received NFI bit for the PDSCH group G2 and stored NFI bit for the PDSCH group G2, the terminal apparatus 1 may determine that the NFI bit of the PDSCH group G2 is not toggled. The terminal apparatus 1 may set the report state of the HARQ-ACK information corresponding to the PDSCH 1115 to not-reported. Here, the terminal apparatus 1 need not flush the HARQ-ACK information, based at least on a fact that the NFI bit corresponding to the PDSCH group G1 is not toggled, and/or the report state of the HARQ-ACK information corresponding to the PDSCH 1113 is already reported. The terminal apparatus 1 need not flush the HARQ-ACK information, based at least on a fact that the NFI bit corresponding to the PDSCH group G2 is not toggled, and/or the report state of the HARQ-ACK information corresponding to the PDSCH 1112 is already reported. The terminal apparatus 1 need not flush the HARQ-ACK information, based at least on a fact that the NFI bit corresponding to the PDSCH group G2 is not toggled, and/or the report state of the HARQ-ACK information corresponding to the PDSCH 1114 is not-reported. The terminal apparatus 1 may multiplex, on the HARQ-ACK codebook 1131, the HARQ-ACK information corresponding to the PDSCH (for example, the PDSCH 1112, the PDSCH 1113, the PDSCH 1114, and the PDSCH 1115) at least satisfying a part or all of condition A1 to condition A4, and transmit (report) the HARQ-ACK information via the PUCCH 1123. Here, transmission of the HARQ-ACK information corresponding to the PDSCH 1112 and the PDSCH 1113 is retransmission, and transmission of the HARQ-ACK information corresponding to the PDSCH 1114 and the PDSCH 1115 is the initial transmission.

Various aspects of apparatuses according to an aspect of the present embodiment will be described below.

(1) In order to achieve the aforementioned object, aspects of the present invention provide the following measures. Specifically, a first aspect of the present invention is a terminal apparatus including: a receiver configured to receive a PDCCH and receive a PDSCH scheduled by the PDCCH; and a transmitter configured to transmit (report), via a PUCCH or a PUSCH, HARQ-ACK information corresponding to the PDSCH, wherein PDCCH #C, PDCCH #G, and PDCCH #I are received, PDSCH #C is scheduled by the PDCCH #C, PDSCH #G is scheduled by the PDCCH #G, and PDSCH #I is scheduled by the PDCCH #I, the PDCCH #G indicates a second value, and the PDCCH #I indicates a third value, the PDCCH #I indicates transmission of at least HARQ-ACK information #I corresponding to the PDSCH #I on PUCCH #3, in a case that the second value and the third value are different from each other, HARQ-ACK information #G corresponding to the PDSCH #G and the HARQ-ACK information #I are multiplexed on the PUCCH #3, in a case that the second value is equal to the third value, HARQ-ACK information #C corresponding to the PDSCH #C, the HARQ-ACK information #G, and the HARQ-ACK information #I are multiplexed on the PUCCH #3, the HARQ-ACK information #G is new transmission on the PUCCH #3, and the HARQ-ACK information #C is retransmission on the PUCCH #3.

(2) A second aspect of the present invention is a terminal apparatus including: a receiver configured to receive a PDCCH and receive a PDSCH scheduled by the PDCCH; and a transmitter configured to transmit (report), via a PUCCH or a PUSCH, HARQ-ACK information corresponding to the PDSCH, wherein based at least on the PDCCH, a PDSCH group ID and a toggle bit corresponding to the PDSCH group ID are indicated, in a case that the toggle bit is toggled, HARQ-ACK information being already reported (the HARQ-ACK information other than HARQ-ACK information not being reported yet) is deleted from an HARQ-ACK codebook corresponding to the PDSCH group ID, and the HARQ-ACK information corresponding to the PDSCH scheduled by the PDCCH is included in the HARQ-ACK codebook.

(3) A third aspect of the present invention is a base station apparatus including: a transmitter configured to transmit a PDCCH and transmit a PDSCH scheduled by the PDCCH; and a receiver configured to receive, via a PUCCH or a PUSCH, HARQ-ACK information corresponding to the PDSCH, wherein PDCCH #C, PDCCH #G, and PDCCH #I are transmitted, PDSCH #C is scheduled by the PDCCH #C, PDSCH #G is scheduled by the PDCCH #G, and PDSCH #I is scheduled by the PDCCH #I, the PDCCH #G indicates a second value, and the PDCCH #I indicates a third value, the PDCCH #I indicates transmission of at least HARQ-ACK information #I corresponding to the PDSCH #I on PUCCH #3, in a case that the second value and the third value are different from each other, HARQ-ACK information #G corresponding to the PDSCH #G and the HARQ-ACK information #I are multiplexed on the PUCCH #3, in a case that the second value is equal to the third value, HARQ-ACK information #C corresponding to the PDSCH #C, the HARQ-ACK information #G, and the HARQ-ACK information #I are multiplexed on the PUCCH #3, the HARQ-ACK information #G is new transmission on the PUCCH #3, and the HARQ-ACK information #C is retransmission on the PUCCH #3.

(4) A fourth aspect of the present invention is a base station apparatus including: a transmitter configured to transmit a PDCCH and transmit a PDSCH scheduled by the PDCCH; and a receiver configured to receive, via a PUCCH or a PUSCH, HARQ-ACK information corresponding to the PDSCH, wherein based at least on the PDCCH, a PDSCH group ID and a toggle bit corresponding to the PDSCH group ID are indicated, in a case that the toggle bit is toggled, HARQ-ACK information being already reported (the HARQ-ACK information other than HARQ-ACK information not being reported yet) is deleted from an HARQ-ACK codebook corresponding to the PDSCH group ID, and the HARQ-ACK information corresponding to the PDSCH scheduled by the PDCCH is included in the HARQ-ACK codebook.

According to the above-described embodiment related to an aspect of the present invention, transmission and/or reception of the HARQ-ACK information between the terminal apparatus 1 and the base station apparatus 3 can be appropriately implemented. By performing appropriate control so that the HARQ-ACK information that is not detected in the base station apparatus 3 is retransmitted by the terminal apparatus 1, and by performing appropriate control so that the HARQ-ACK information that is detected in the base station apparatus 3 is not retransmitted by the terminal apparatus 1, an aspect of the present invention enables implementation of efficient communication.

A program running on the base station apparatus 3 and the terminal apparatus 1 according to one aspect of the present invention may be a program (program that causes a computer to function) that controls a Central Processing Unit (CPU) and the like, such that the program realizes the functions of the above-described embodiment according to one aspect of the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the aforementioned embodiment may be partially implemented by a computer. In such a case, a program for implementing such control functions may be recorded on a computer-readable recording medium to cause a computer system to read and execute the program recorded on this recording medium.

Note that it is assumed that the "computer system" mentioned here refers to a computer system built into the terminal apparatus 1 or the base station apparatus 3, and the computer system includes an OS and hardware components such as a peripheral device. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains the program for a short period of time, such as a communication wire that is used to transmit the program over a network such as the Internet or over a communication line such as a telephone line, and a medium that retains the program for a certain period of time, such as a volatile memory within the computer system which functions as a server or a client in a case that the program is transmitted via the communication wire. Furthermore, the aforementioned program may be configured to implement part of the functions described above, and also may be configured to be capable of implementing the functions described above in combination with a program already recorded in the computer system.

The terminal apparatus 1 may include at least one processor, and at least one memory including a computer program instruction (computer program). The memory and the computer program instruction (computer program) may adopt a configuration of causing the terminal apparatus 1 to perform the operation and the processing described in the above embodiment by using a processor. The base station apparatus 3 may include at least one processor, and at least one memory including a computer program instruction (computer program). The memory and the computer program instruction (computer program) may adopt a configuration of causing the base station apparatus 3 to perform the operation and the processing described in the above embodiment by using a processor.

Furthermore, the base station apparatus 3 according to the aforementioned embodiment may be achieved as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have some or all of the functions of a higher node for an eNodeB and/or a gNB.

Also, some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. A circuit integration technique is not limited to the LSI, and may be implemented with a dedicated circuit or a general-purpose processor. Moreover, in a case that with advances in semiconductor technology, a circuit integration technology with which an LSI is replaced appears, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit

The invention claimed is:

1. A terminal apparatus comprising:
reception circuitry configured to detect a Downlink Control Information (DCI) format; and
transmission circuitry configured to transmit Hybrid Automatic Repeat request ACKnowledgement (HARQ-ACK) information generated based on one or more Physical Downlink Shared Channels (PDSCHs) associated with a PDSCH Group Indicator, wherein
in a case that the DCI format includes a PDSCH Group Indicator field, a value of the PDSCH Group Indicator is indicated based on the PDSCH Group Indicator field,
in a case that the DCI format does not include a PDSCH Group Indicator field, the value of the PDSCH Group Indicator is prescribed value.

2. A base station apparatus comprising:
transmission circuitry configured to a Downlink Control Information (DCI) format; and
reception circuitry configured to receive Hybrid Automatic Repeat request ACKnowledgement (HARQ-ACK) information generated based on one or more Physical Downlink Shared Channels (PDSCHs) associated with a PDSCH Group Indicator, wherein
in a case that the DCI format includes a PDSCH Group Indicator field, a value of the PDSCH Group Indicator is indicated based on the PDSCH Group Indicator field,
in a case that the DCI format does not include a PDSCH Group Indicator field, the value of the PDSCH Group Indicator is prescribed value.

3. A communication method used for a terminal apparatus, the communication method comprising:
detecting a Downlink Control Information (DCI) format; and
transmitting Hybrid Automatic Repeat request ACKnowledgement (HARQ-ACK) information associated with one or more Physical Downlink Shared Channels (PDSCHs) associated with a PDSCH Group Indicator, wherein
in a case that the DCI format includes a PDSCH Group Indicator field, a value of the PDSCH Group Indicator is indicated based on the PDSCH Group Indicator field,
in a case that the DCI format does not include a PDSCH Group Indicator field, the value of the PDSCH Group Indicator is prescribed value.

* * * * *